United States Patent
Isokawa et al.

(10) Patent No.: US 11,379,787 B2
(45) Date of Patent: Jul. 5, 2022

(54) EVALUATION DEVICE, EVALUATION METHOD, AND EVALUATION PROGRAM

(71) Applicant: Hitachi Transport System, Ltd., Tokyo (JP)

(72) Inventors: Miho Isokawa, Tokyo (JP); Junko Hosoda, Tokyo (JP); Takaharu Sakurada, Tokyo (JP); Takahiro Nishikawa, Tokyo (JP)

(73) Assignee: Hitachi Transport System, Ltd., Tokyo (JP)

( * ) Notice: Subject to any disclaimer, the term of this patent is extended or adjusted under 35 U.S.C. 154(b) by 419 days.

(21) Appl. No.: 16/331,275

(22) PCT Filed: Sep. 9, 2016

(86) PCT No.: PCT/JP2016/076584
§ 371 (c)(1),
(2) Date: Mar. 7, 2019

(87) PCT Pub. No.: WO2018/047289
PCT Pub. Date: Mar. 15, 2018

(65) Prior Publication Data
US 2019/0354932 A1  Nov. 21, 2019

(51) Int. Cl.
*G06Q 10/08* (2012.01)
*G06Q 10/10* (2012.01)

(52) U.S. Cl.
CPC . *G06Q 10/08345* (2013.01); *G06Q 10/08355* (2013.01); *G06Q 10/1097* (2013.01)

(58) Field of Classification Search
CPC .................................................. G06Q 10/08
(Continued)

(56) References Cited

U.S. PATENT DOCUMENTS 6,219,653 B1 *  4/2001  O'Neill ............... G06Q 10/08
                                                          705/29
2004/0215480 A1* 10/2004  Kadaba ................. B07C 3/00
                                                          705/338
(Continued)

FOREIGN PATENT DOCUMENTS

JP        11-102394 A    4/1999
JP     2002-352372 A    12/2002
(Continued)

OTHER PUBLICATIONS

International Search Report (PCT/ISA/210) issued in PCT Application No. PCT/JP2016/076584 dated Dec. 6, 2016 with English translation (four (4) pages).
(Continued)

*Primary Examiner* — Nga B Nguyen
(74) *Attorney, Agent, or Firm* — Crowell & Moring LLP

(57) ABSTRACT

Provided is an evaluation device which stores base information, base destination information, demand information, a route service tariff, and a route delivery tariff in a memory device. The evaluation device uses the base information, the delivery destination information, the demand information, and the route service tariff to create delivery course information relating to a route service which includes a delivery course along which a delivery vehicle delivers a quantity of cargo delivered to a delivery destination from a base to the delivery destination by a route service and a cost per delivery course, uses the base information, the delivery destination information, the demand information, and the route delivery tariff to create delivery course information relating to route delivery which includes a delivery course along which a delivery vehicle delivers a quantity of cargo delivered to a delivery destination from a base to the delivery destination by the route delivery and delivery cost of the delivery course, determines a delivery schedule by (Continued)

extracting the delivery course information from each of the bases configuring a combination of the bases for each combination of a plurality of the bases from a set of the delivery course information based on the delivery cost included in the delivery course information, and outputs a delivery schedule of each combination of the plurality of bases.

12 Claims, 25 Drawing Sheets

(58) Field of Classification Search
USPC .......................................................... 705/7.21
See application file for complete search history.

(56) References Cited

U.S. PATENT DOCUMENTS

| | | | | |
|---|---|---|---|---|
| 2006/0020366 A1* | 1/2006 | Bloom | ...................... | B07C 3/02 |
| | | | | 700/226 |
| 2011/0178945 A1 | 7/2011 | Hirai | | |
| 2015/0081360 A1* | 3/2015 | Sun | ........................ | G06Q 50/28 |
| | | | | 705/7.13 |
| 2015/0332206 A1* | 11/2015 | Trew | .................... | G06Q 10/083 |
| | | | | 705/330 |
| 2016/0171439 A1* | 6/2016 | Ladden | .............. | G06Q 10/0832 |
| | | | | 705/340 |
| 2017/0083862 A1* | 3/2017 | Loubriel | ............ | G06Q 10/0835 |
| 2018/0096287 A1* | 4/2018 | Senger | ............. | G06Q 10/08355 |

FOREIGN PATENT DOCUMENTS

| | | |
|---|---|---|
| JP | 2002-356232 A1 | 12/2002 |
| JP | 2004-272615 A | 9/2004 |
| JP | 2004-323229 A | 11/2004 |
| JP | 2013-14387 A | 1/2013 |
| WO | WO 2010/035498 A1 | 4/2010 |

OTHER PUBLICATIONS

Japanese-language Written Opinion (PCT/ISA/237) issued in PCT Application No. PCT/JP2016/076584 dated Dec. 6, 2016 (five (5) pages).

Written Opinion issued in counterpart Singaporean Application No. 11201901488Y dated Jan. 14, 2020 (six (6) pages).

Extended European Search Report issued in counterpart European Application No. 16915707.0 dated Jan. 3, 2020 (eight (8) pages).

* cited by examiner

FIG. 27

| COMBINATION OF BASE | dx1 | dx2 | dx3 | dx1,dx2 | dx1,dx3 | dx2,dx3 | dx1,dx2,dx3 |
|---|---|---|---|---|---|---|---|
| FIRST DEMAND INFORMATION LIST | w1×C1_1 | w1×C1_2 | w1×C1_3 | w1×C1_12 | w1×C1_3 | w1×C1_23 | w1×C1_123 |
| SECOND DEMAND INFORMATION LIST | w2×C2_1 | w2×C2_2 | w2×C2_3 | w2×C2_12 | w2×C2_3 | w2×C2_23 | w2×C2_123 |
| TOTAL | T1 | T2 | T3 | T12 | T13 | T23 | T123 |

EVALUATION DEVICE, EVALUATION METHOD, AND EVALUATION PROGRAM

TECHNICAL FIELD

The present invention relates to an evaluation device, an evaluation method, and an evaluation program for evaluating a disposition of a distribution base.

BACKGROUND ART

PTL 1 discloses a delivery base location determination device that optimally determines locations of a plurality of delivery bases for delivering products to a large number of destinations. The delivery base location determination device extracts, as candidate groups, delivery bases from which products can be delivered to a delivery destination within a prescribed period of time and determines, from the candidate groups, a configuration of the delivery base having the minimum number of delivery bases and covering all delivery destinations.

In addition, PTL 2 discloses a method of planning a transportation/delivery schedule including selecting a base having a minimum transportation cost for each order in a delivery area including a plurality of bases and a plurality of delivery destinations, obtaining a deficiency rate of delivery means from a required quantity of the delivery means of each base, and determining a delivery source base so that a variation in the deficiency rate is equal to or less than a predetermined value.

The techniques of PTL 1 and PTL 2 calculate delivery time or costs in consideration of directly delivering products from each base to each delivery destination and select the base or determine the delivery source base from which products are delivered to each delivery destination, when determining the combination of the base and the delivery destination.

CITATION LIST

Patent Literature

PTL 1: JP 2004-272615 A
PTL 2: JP 11-102394 A

SUMMARY OF INVENTION

Technical Problem

In practice, however, as the delivery means, there are a route service in which costs are incurred due to transportation of cargo of a plurality of shippers mixed on one truck in packing units or various types of delivery means such as a route delivery in which a truck is chartered to circulate a plurality of delivery destinations. For example, suitable delivery means is different according to a location situation of the delivery destination, a quantity of cargo to be delivered, loading capacity of a truck, a delivery date, and the like. Therefore, it is difficult to know the optimal delivery route and delivery means for transporting cargo only by consideration of directly delivering the cargo to each delivery destination.

An object of the present invention is to provide a delivery schedule for each combination of a plurality of bases in consideration of both a route service and a route delivery.

Solution to Problem

An aspect of the invention disclosed in the present application relates to an evaluation device, an evaluation method, and an evaluation program, wherein a memory device stores base information which holds positional information of a distribution base, delivery destination information which holds positional information of delivery destinations, demand information which holds a size and a quantity of cargo delivered from the base to the delivery destinations, a route service tariff which holds cost determined by a size of the cargo and a delivery distance of the cargo from the base to the delivery destination in a route service in which the cargo of a plurality of shippers is mixed on one delivery vehicle, and a route delivery tariff which holds cost determined by loading capacity of the delivery vehicle and a delivery distance of the cargo from the base to the delivery destination in a route delivery in which one delivery vehicle loaded with a cargo of one shipper circulates the plurality of delivery destinations from the base so as to deliver the cargo, and a processor executes creation processing which creates delivery course information on a route service including a delivery course along which the delivery vehicle delivers a quantity of the cargo delivered to the delivery destination from the base to the delivery destination in the route service and delivery cost of the delivery course, based on the base information, the delivery destination information, the demand information, and the route service tariff, and creates delivery course information on a route delivery including a delivery course along which the delivery vehicle delivers the quantity of the cargo delivered to the delivery destination from the base to the delivery destination in the route delivery and delivery cost of the delivery course, based on the base information, the delivery destination information, the demand information, and the route delivery tariff, determination processing which determines a delivery schedule by extracting the delivery course information from each of the bases configuring a combination of the bases for each of the combination of a plurality of the bases from a set of the delivery course information created by the creation processing based on the delivery cost included in the delivery course information and output processing which outputs the delivery schedule of each of the combinations of the plurality of bases determined by the determination processing.

Advantageous Effects of Invention

According to the representative embodiment of the present invention, it is possible to provide the delivery schedule for each combination of a plurality of bases in consideration of both the route service and the route delivery. The problems, configurations, and effects other than those described above will be clarified from the description of the embodiments below.

BRIEF DESCRIPTION OF DRAWINGS

FIG. 27 is an explanatory diagram showing cost calculation examples for each combination of bases for each demand information list.

DESCRIPTION OF EMBODIMENTS

Hereinafter, the present embodiment will be described below. In the embodiment, a "route service" is a delivery method for mixing cargo of a plurality of shippers on one delivery vehicle (for example, a truck). In the case of the route service, shippers generally pay a fare according to a weight of cargo or a transportation distance of cargo. A "route delivery" is a delivery method for delivering cargo by allowing one delivery vehicle (for example, a truck) to circulate a plurality of delivery destinations from abase of one shipper. In the case of the route delivery, it is common to pay a fare according to a vehicle type and a traveling distance or a traveling time of a truck. "Tariff" is information that defines a fare, and is stored, for example, in a data table format.

Hardware Configuration Example of Evaluation Device

Figure 1:
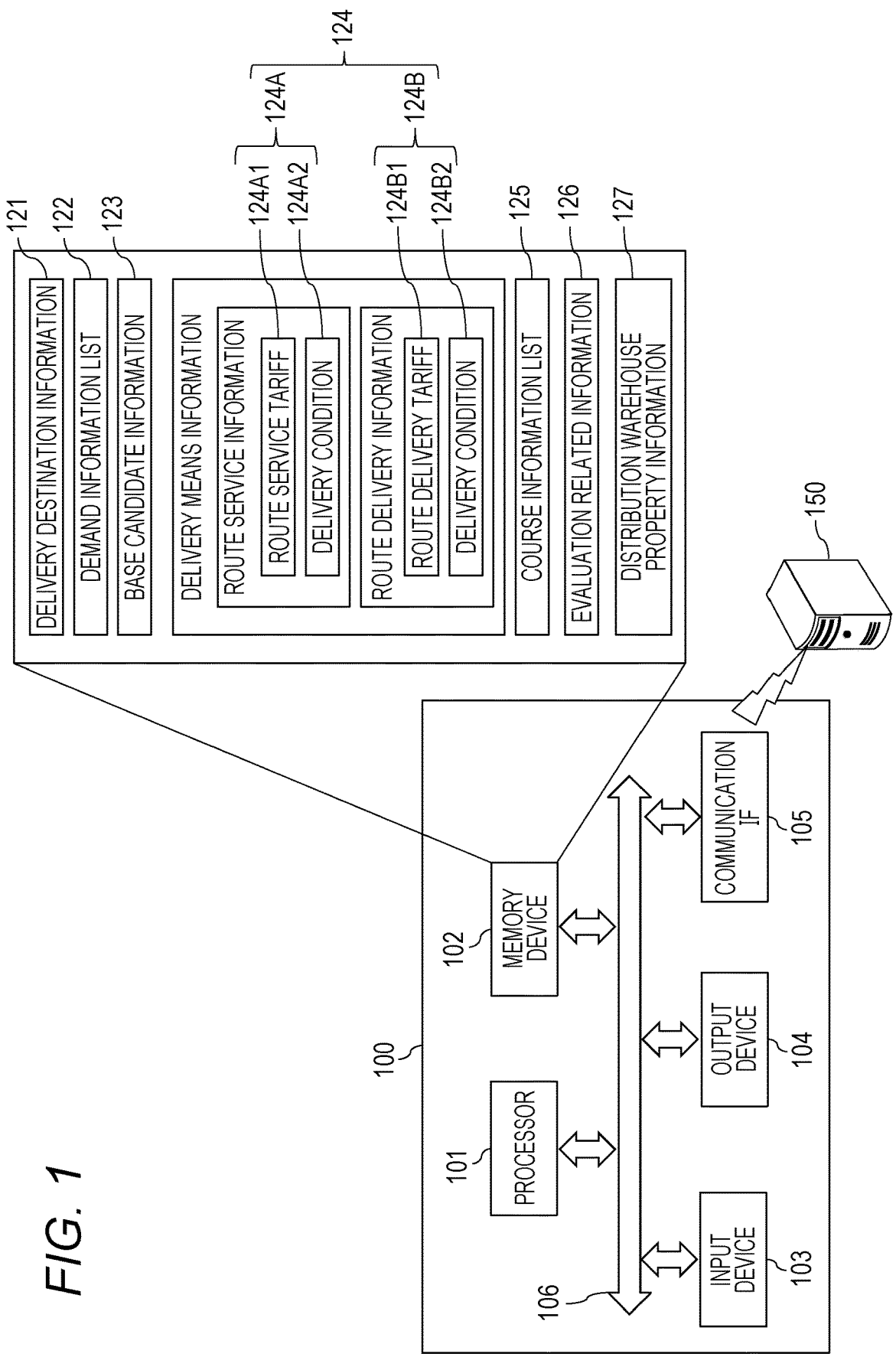
FIG. 1 is a block diagram showing a hardware configuration example of an evaluation device.

FIG. 1 is a block diagram showing a hardware configuration example of an evaluation device. The evaluation device 100 includes a processor 101, a memory device 102, an input device 103, an output device 104, and a communication interface (communication IF 105). The processor 101, the memory device 102, the input device 103, the output device 104, and the communication IF 105 are connected by a bus. The processor 101 controls the evaluation device 100. The memory device 102 is a working area of the processor 101. In addition, the memory device 102 is a non-temporal or temporal recording medium that stores various programs and data. Examples of the memory device 102 include a read only memory (ROM), a random access memory (RAM), a hard disk drive (HDD), and flash memory. The input device 103 inputs data. Examples of the input device 103 include a keyboard, a mouse, a touch panel, a ten key, and a scanner. The output device 104 outputs data. Examples of the output device 104 include a display device and a printer. The communication IF 105 is connected with the network and transmits and receives data to and from an external server 150 such as a geographic information server and a distribution warehouse property information server.

The memory device 102 stores delivery destination information 121, a demand information list 122, base candidate information 123, delivery means information 124, a course information list 125, evaluation related information 126, and distribution warehouse property information 127. The delivery destination information 121 is information on a delivery destination (also referred to as a vendor) such as a retail store. The demand information list 122 is a set of demand information. The demand information is information indicating the quantity and size of cargo to be delivered to each delivery destination. The base candidate information 123 is information on candidate locations at which distribution bases are disposed. The delivery means information 124 is information on a route service and a route delivery.

The delivery means information 124 is information for defining a type of delivery service which is delivery means and includes route service information 124A and route delivery information. The route service information 124A includes a route service tariff 124A1 and a delivery condition 124A2. Details of the route service information 124A will be described with reference to FIG. 5. Route delivery information 124B includes a route delivery tariff 124B1 and a delivery condition 124B2. Details of the route delivery information 124B will be described with reference to FIG. 6.

The course information list 125 is a set of course information. The course information is information including a distance and a required time between two points acquired from a geographic information server 7. The evaluation related information 126 includes information which is being evaluated and information which is already evaluated. The distribution warehouse property information 127 is information on an existing distribution warehouse. The physical distribution warehouse property information 127 is information acquired from the distribution warehouse property information server.

The geographic information server is a server which manages geographical information and transmits the geographical information to the evaluation device 100 corresponding to a request from the evaluation device 100. The distribution warehouse property information server is a server which manages the distribution warehouse property information 127 and transmits the distribution warehouse property information 127 to the evaluation device 100 corresponding to the request from the evaluation device 100.

Information Stored in Memory Device 102

Figure 2:
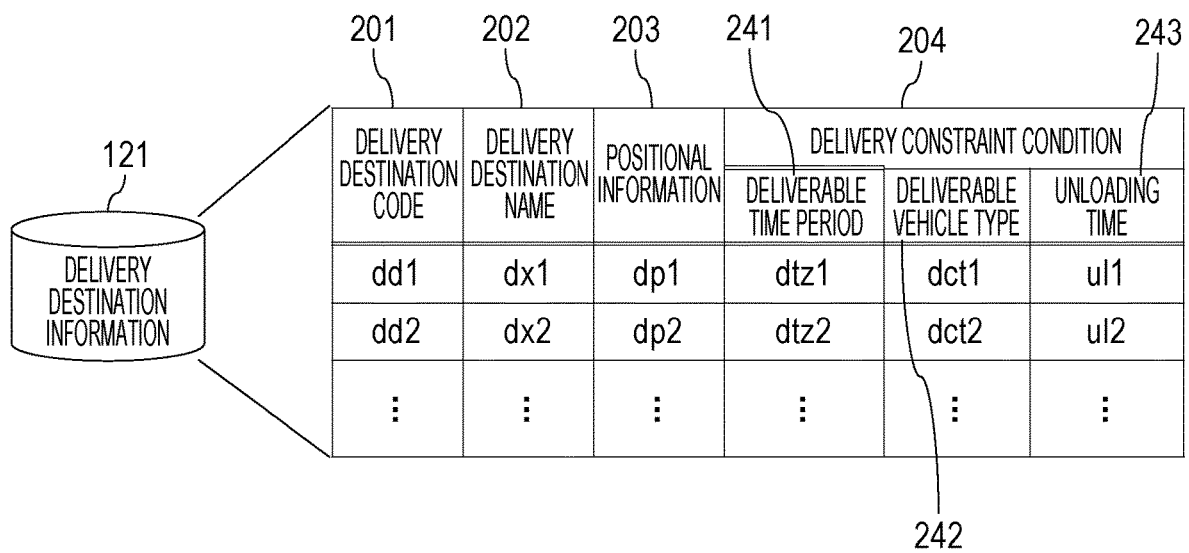
FIG. 2 is an explanatory diagram showing an example of delivery destination information shown in FIG. 1.

FIG. 2 is an explanatory diagram showing an example of the delivery destination information 121 shown in FIG. 1. The delivery destination information 121 includes a delivery destination code 201, a delivery destination name 202, positional information 203, and a delivery constraint condition 204. The delivery destination code 201 is identification information uniquely specifying a delivery destination. The delivery destination name 202 is a delivery destination name specified by the delivery destination code 201. The positional information 203 is information indicating a seat of a delivery destination. For example, the positional information 203 is an address, or latitude and longitude information. The delivery constraint condition 204 is a condition which should be observed in order to deliver cargo to the delivery destination at the time of planning the delivery schedule. The delivery constraint condition 204 includes a deliverable time period 241, a deliverable vehicle type 242, and an unloading time 243. The deliverable time period 241 is a time period in which delivery at the delivery destination can be made. The deliverable vehicle type 242 is a vehicle type of a truck which can enter the delivery destination with the truck. The unloading time 243 is the time when a driver unloads cargo from a truck when the truck arrives at the delivery destination.

Figure 3:
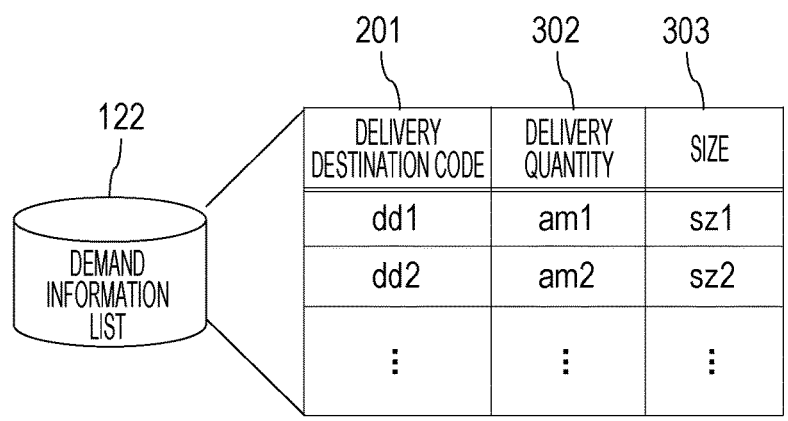
FIG. 3 is an explanatory diagram showing an example of a demand information list shown in FIG. 1.

FIG. 3 is an explanatory diagram showing an example of the demand information list 122 shown in FIG. 1. The demand information list 122 has one or more demand information. The demand information has a delivery quantity 302 and a size 303 for each delivery destination code 201. The delivery quantity 302 is a quantity of cargo to be delivered to a delivery destination. The size 303 is a size of cargo determined by a dimension (for example, the sum of the vertical and horizontal height) and a weight of cargo. The demand information is information indicating how much delivery quantity 302 of which size 303 is required at which destination.

Figure 4:
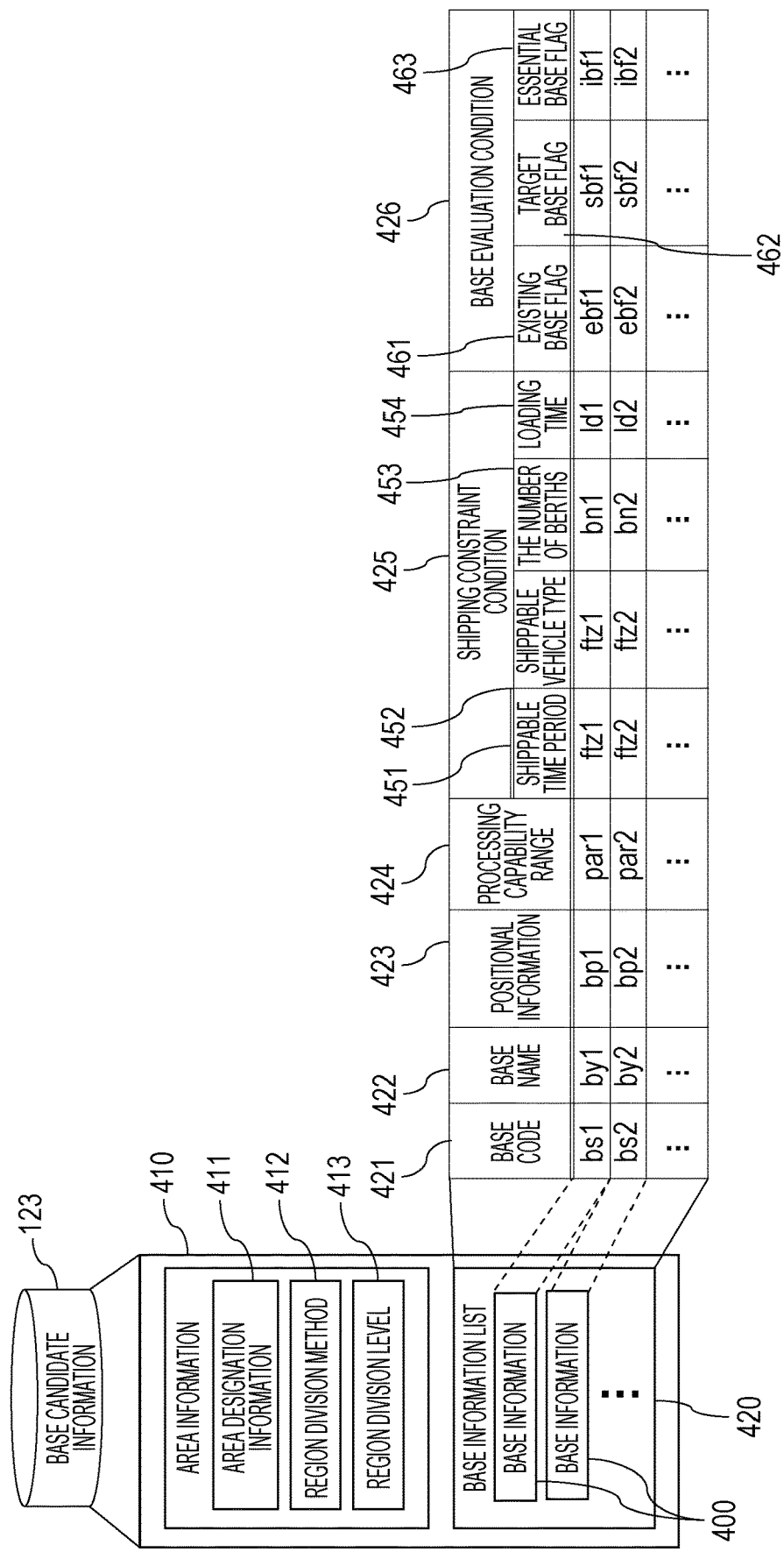
FIG. 4 is an explanatory diagram showing an example of base candidate information shown in FIG. 1.

FIG. 4 is an explanatory diagram showing an example of the base candidate information 123 shown in FIG. 1. The base candidate information 123 includes at least one of area information 410 and a base information list 420. The area information 410 is information for specifying an area, and includes area designation information 411, a region division method 412, and a region division level 413. The area designation information 411 is information for designating an area such as a country name, a local name, and a prefecture name.

The region division method 412 is a method of dividing the area designated by the area designation information 411, and is, for example, division by administrative division or division by a grid. The division by the administrative division is a method of dividing the area, which is designated by the area designation information 411, by the administrative division. In this case, it is necessary to designate a division unit of prefecture or municipality at the region division level 413. The division by the grid is a method of dividing the area, which is designated by the area designation information 411, in a grid form. In this case, it is necessary to designate a size of the grid at the region division level 413.

In the case where the base candidate information 123 includes the area information 410, the area designated by the area designation information 411 is divided by the region division method 412, and one base candidate is created for each divided region. The created base candidate is added to the base information list 420 as the base information.

The base information 400 is information on the base of the distribution and may be information based on an existing distribution warehouse or fictional information. The base information 400 includes a base code 421, a base name 422, positional information 423, a processing capability range 424, a shipping constraint condition 425, and a base constraint condition 426. The base code 421 is identification information uniquely specifying a base. The base name 422 is a base name specified by the base code 421. The positional information 423 is information indicating a seat of the base. For example, the positional information 423 is an address, or latitude and longitude information. The processing capability range 424 is information indicating the lower limit and the upper limit of the quantity to be shipped from the base.

The shipping constraint condition 425 is a condition which should be observed in order to deliver cargo from a base at the time of planning the delivery schedule. The shipping constraint condition 425 includes a shippable time period 451, a shippable vehicle type 452, the number of berths 453, and a loading time 454. The shippable time period 451 is a time period in which shipping from the base can be made. The shippable vehicle type 452 is a vehicle type of a truck that can be delivered from the base. The number of berths 453 is the upper limit of the number of tracks that can simultaneously be loaded on the track at the base. The loading time 454 is the time when a driver of a truck loads cargo on the truck before departing from the base.

The base constraint condition 426 is a condition for a user to set handling of the base at the time of evaluation at the time of planning the delivery schedule. The base constraint condition 426 includes an existing base flag 461, a target base flag 462, and an essential base flag 463. The existing base flag 461 is a flag indicating whether the base is an existing base in which the base exists. The target base flag 462 is a flag that can arbitrarily set whether to include the base in the evaluation target of the base disposition. The essential base flag 463 is a flag that can be set so that the base should be included in the evaluation target of the base disposition.

Figure 5:
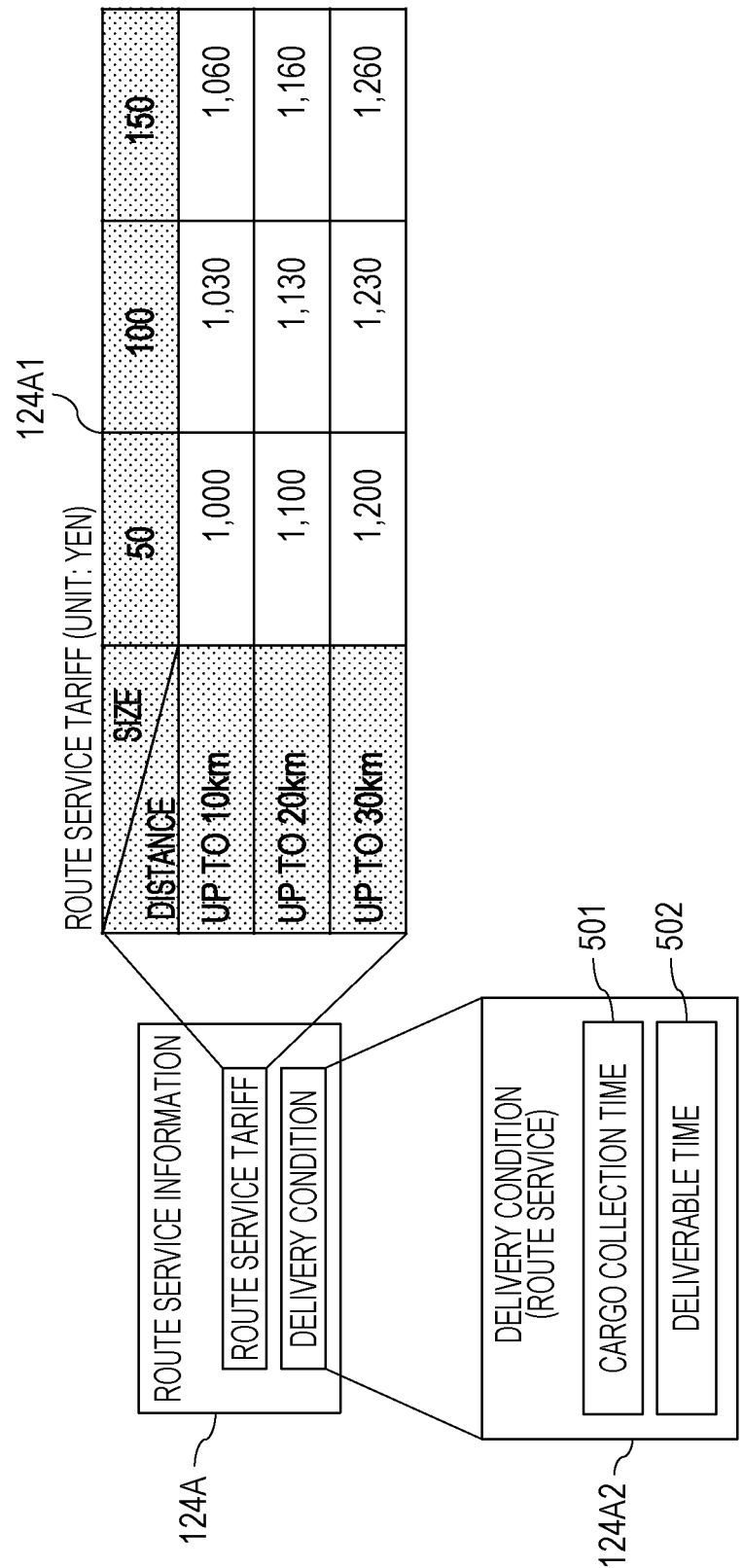
FIG. 5 is an explanatory diagram showing an example of route service information shown in FIG. 1.

FIG. 5 is an explanatory diagram showing an example of the route service information 124A shown in FIG. 1. The route service information 124A includes a route service tariff 124A1 and a delivery condition 124A2. The route service tariff 124A1 is a tariff relating to a route service. The route service tariff 124A1 determines a fare according to the distance (which may be the delivery time) to the delivery destination and the size of the cargo. The delivery condition 124A2 includes a cargo collection time and a deliverable time. The cargo collection time 501 is the time to collect cargo at the base. A deliverable time 502 is the deliverable time when cargo can be delivered to the delivery destination. Even in the same route service, when there are a plurality of delivery companies and the tariffs and delivery conditions are different for each delivery company, a plurality of tariffs and delivery conditions may be included in the delivery means information 124.

Figure 6:
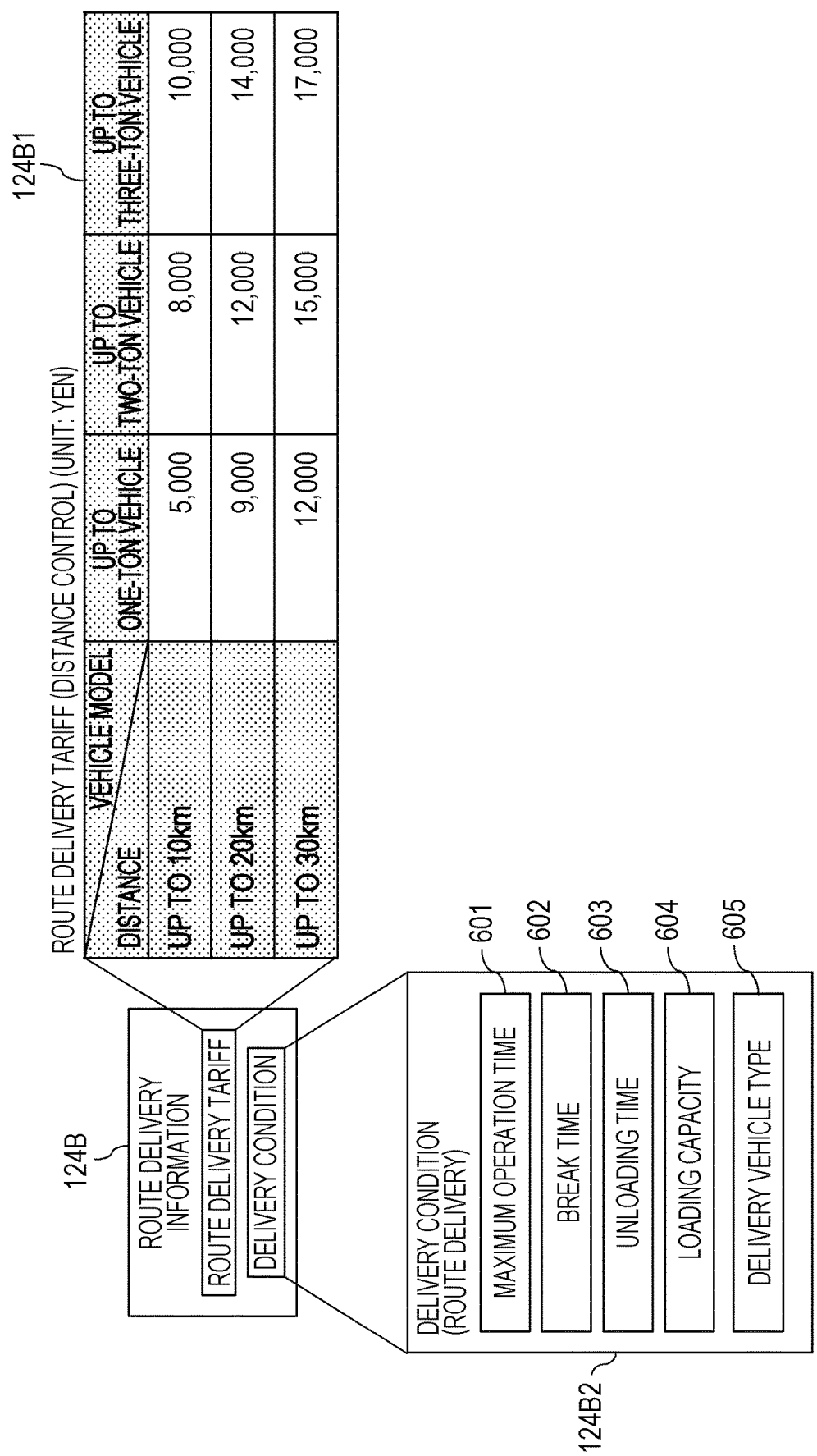
FIG. 6 is an explanatory diagram showing an example of delivery route information included in delivery means information shown in FIG. 1.

FIG. 6 is an explanatory diagram showing an example of the route delivery information 124B included in delivery means information 124 shown in FIG. 1. The route delivery information 124B includes the route delivery tariff 124B1 and the delivery condition 124B2. The route delivery tariff 124B1 is the tariff relating to the route delivery. In the route delivery tariff 124B1, a fare is determined by the distance (which may be the delivery time) to the delivery destination and the vehicle type which defines the loading capacity of the truck. The delivery condition 124B2 includes a maximum operation time 601, a break time 602, an unloading time 603, loading capacity 604, and a delivery vehicle type 605. The maximum operation time 601 is the upper limit of an operation time when a truck can be traveled. The break time 602 is the time when the driver of the truck takes a break. The unloading time 243 is the time when a driver unloads cargo from the truck when the truck arrives at the delivery destination. The loading capacity 604 is capacity (weight) that can be loaded for each vehicle type of truck. The delivery vehicle type 605 is the vehicle type of the truck to be delivered that can be used to plan the delivery schedule.

Note that the delivery destination information 121, the demand information list 122, the base candidate information 123, and the delivery means information 124 may be stored in the memory device 102 in advance or uploaded to the evaluation device 100 at the time of planning the delivery schedule, and may be created and updated by the user via a graphical user interface (GUI) of the evaluation device 100.

Figure 7:
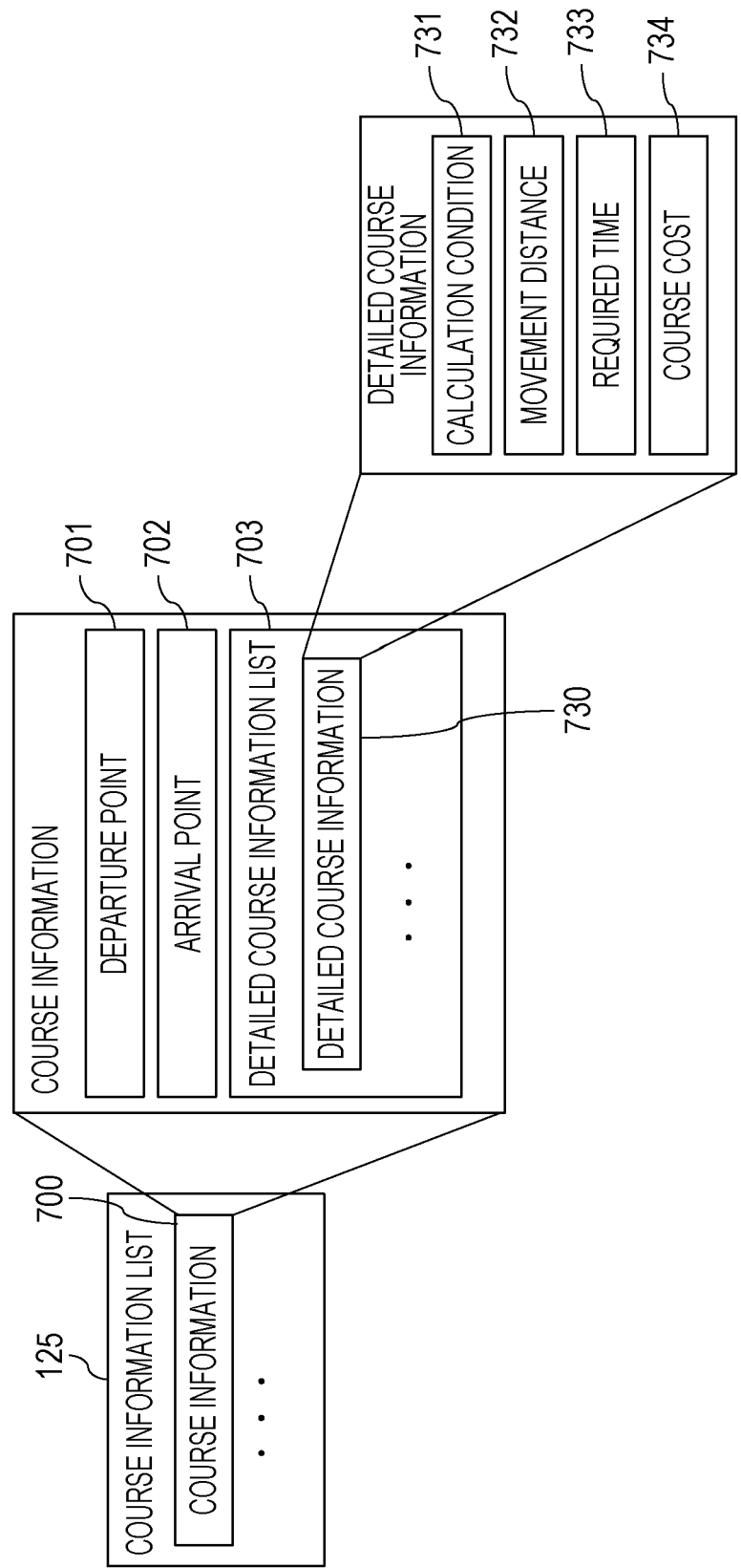
FIG. 7 is an explanatory diagram showing an example of a course information list shown in FIG. 1.

FIG. 7 is an explanatory diagram showing an example of the course information list 125 shown in FIG. 1. The course information list 125 is a set of course information 700. The course information 700 includes, for example, the distance between two points acquired from the geographic information server and the required time. Specifically, for example, the course information 700 includes a departure point 701, an arrival point 702, and a detailed course information list 703.

The departure point 701 is a departure position of a course specified by the course information 700, and is designated by the base code 421 or the delivery destination code 201. The arrival point 702 is an arrival position of a course specified by the course information 700, and is designated by the base code 421 or the delivery destination code 201. The detailed course information list 703 has one or more detailed route information 730 for one course information 700. The detailed course information 730 includes a calculation condition 731, a movement distance 732, a required time 733, and a course cost 734.

The calculation condition 731 is a condition necessary for calculating the movement distance 732, the required time 733, and the course cost 734. Specifically, for example, the calculation condition 731 includes traffic information such as day of the week, a time period, presence or absence of toll road use, presence or absence of right turn in course selection, a traveling speed condition, and a road width condition. The movement distance 732 is a road distance from the departure point 701 to the arrival point 702 in the case of observing the calculation condition 731. The required time 733 is a time required for movement from the departure point 701 to the arrival point 702. The course cost 734 is a toll road fee necessary for traveling along a course specified by the course information 700.

Figure 8:
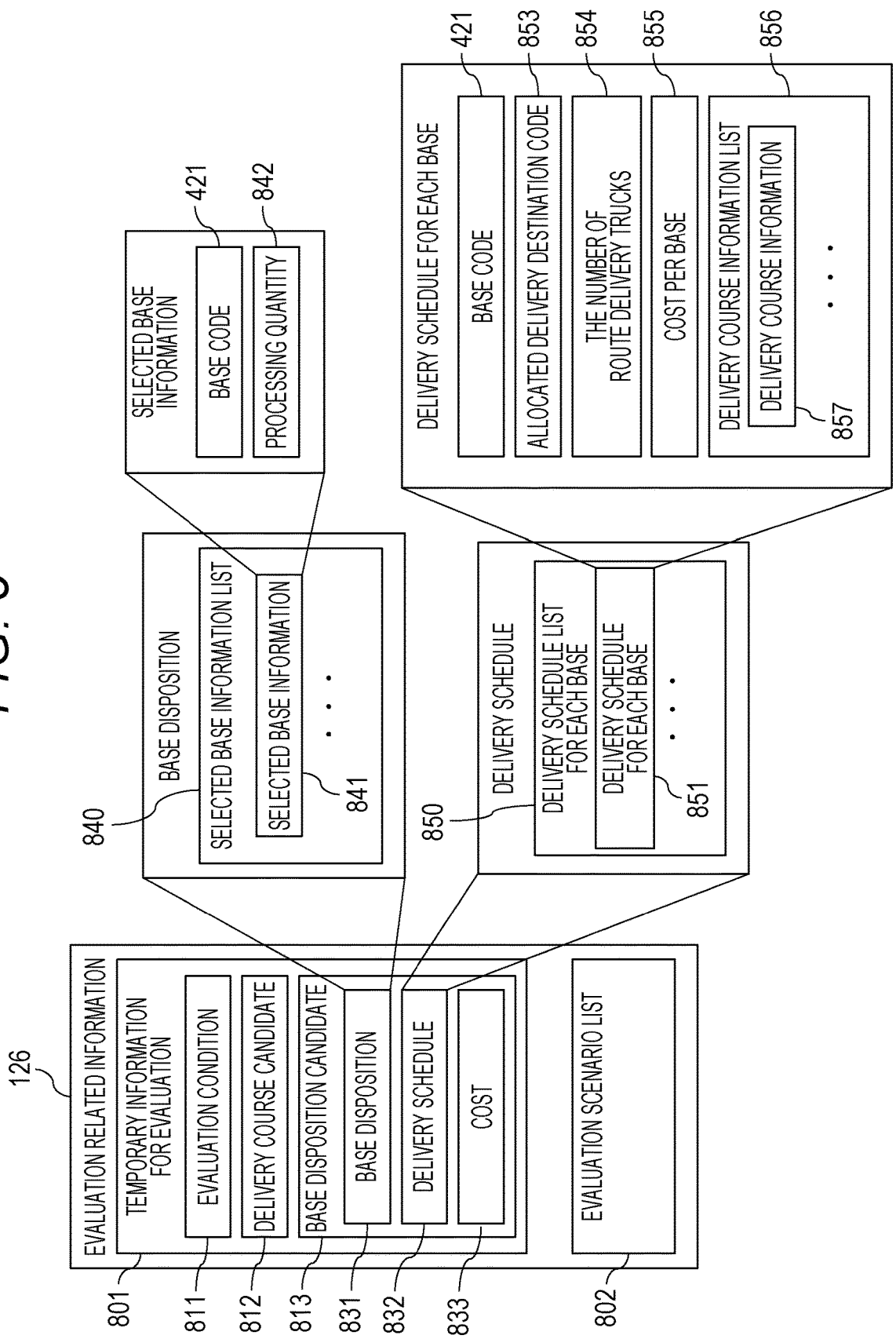
FIG. 8 is an explanatory diagram showing an example of temporary information for evaluation included in evaluation related information shown in FIG. 1.

FIG. 8 is an explanatory diagram showing an example of temporary information for evaluation included in the evaluation related information 126 shown in FIG. 1. The temporary information for evaluation 801 is temporarily stored information used for the evaluation of the delivery schedule which is planned. When the evaluation is completed, the temporary information for evaluation 801 is stored in an evaluation scenario list 802 as an evaluation scenario. The temporary information for evaluation 801 includes an evaluation condition 811, a delivery course candidate 812, and a base disposition candidate 813. The evaluation condition 811 includes the maximum number of bases, setting contents of the base constraint condition 426, and presence or absence of atoll road which is one of the setting contents of the calculation condition 731. The evaluation condition 811 is a condition set through the input device 103.

The delivery course candidate 812 is delivery course information 857 having the minimum cost among one or more delivery course information 857 which is created in the evaluation process. The base disposition candidate 813 is a set of base candidates selected in the evaluation process. The base disposition candidate 813 includes abase disposition 831, a delivery schedule 832, and a cost 833. The base disposition 831 includes a selected base information list 840. The selected base information list 840 includes one or more selected base information 841. The selected base information 841 is information on the base selected in the evaluation process. The selected base information 841 includes the base code 421 and a processing quantity 842. The processing quantity 842 is a quantity of cargo that can be handled at the base.

The delivery schedule 832 has a delivery schedule list for each base 850 which aggregates the delivery schedule for each base 851 for each base (that is, the base disposition 831) selected by the evaluation. The delivery schedule for each base 851 is a delivery schedule including all deliveries starting from the corresponding base. Specifically, for example, the delivery schedule for each base 851 includes the base code 421, an allocated delivery destination code 853, the number of route delivery trucks 854, a cost per base 855, and a delivery course information list 856. The allocated delivery destination code 853 is the delivery destination code 201 of the delivery destination to be delivered from the base specified by the base code 421.

The allocated delivery destination code 853 is the delivery destination code 201 of the delivery destination which can be delivered from the base within the range of the maximum operation time 601. The number of route delivery trucks 854 is the number of trucks used when the delivery means is the route delivery. The cost per base 855 is a total of costs when cargo is delivered from the base to the delivery destination of the allocated delivery destination code 853 (see FIG. 13). The delivery course information list 856 is a set of the delivery course information 857 which is information on a delivery service basis starting from the base. The cost 833 is the total of the cost per base 855.

Figure 9:
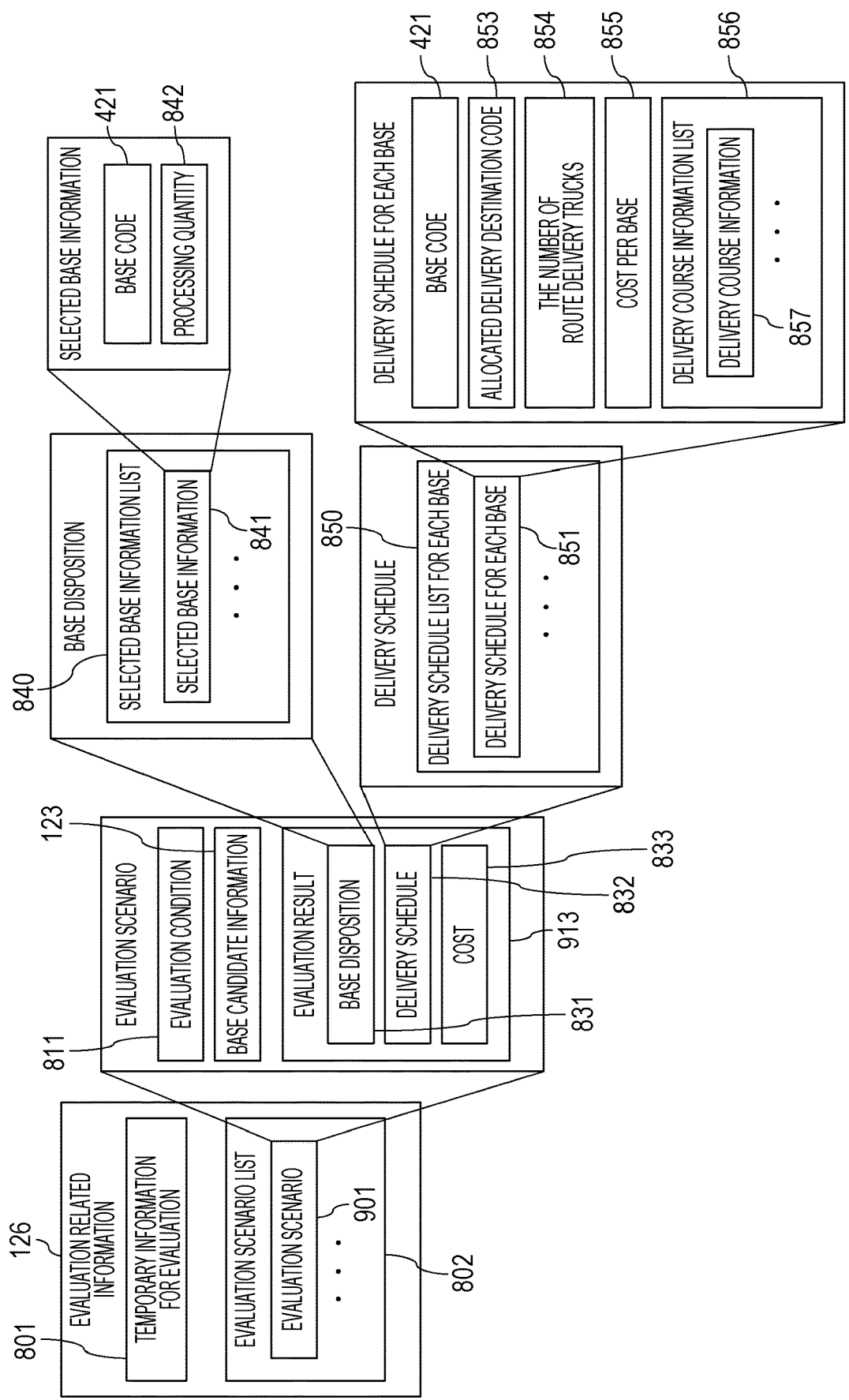
FIG. 9 is an explanatory diagram showing an example of an evaluation scenario list included in the evaluation related information shown in FIG. 1.

FIG. 9 is an explanatory diagram showing an example of an evaluation scenario list 802 included in the evaluation related information 126 shown in FIG. 1. The evaluation scenario list 802 includes zero or more evaluation scenarios 901. The evaluation scenario 901 includes the evaluation condition 811, the base candidate information 123, and an evaluation result 913.

Figure 10:
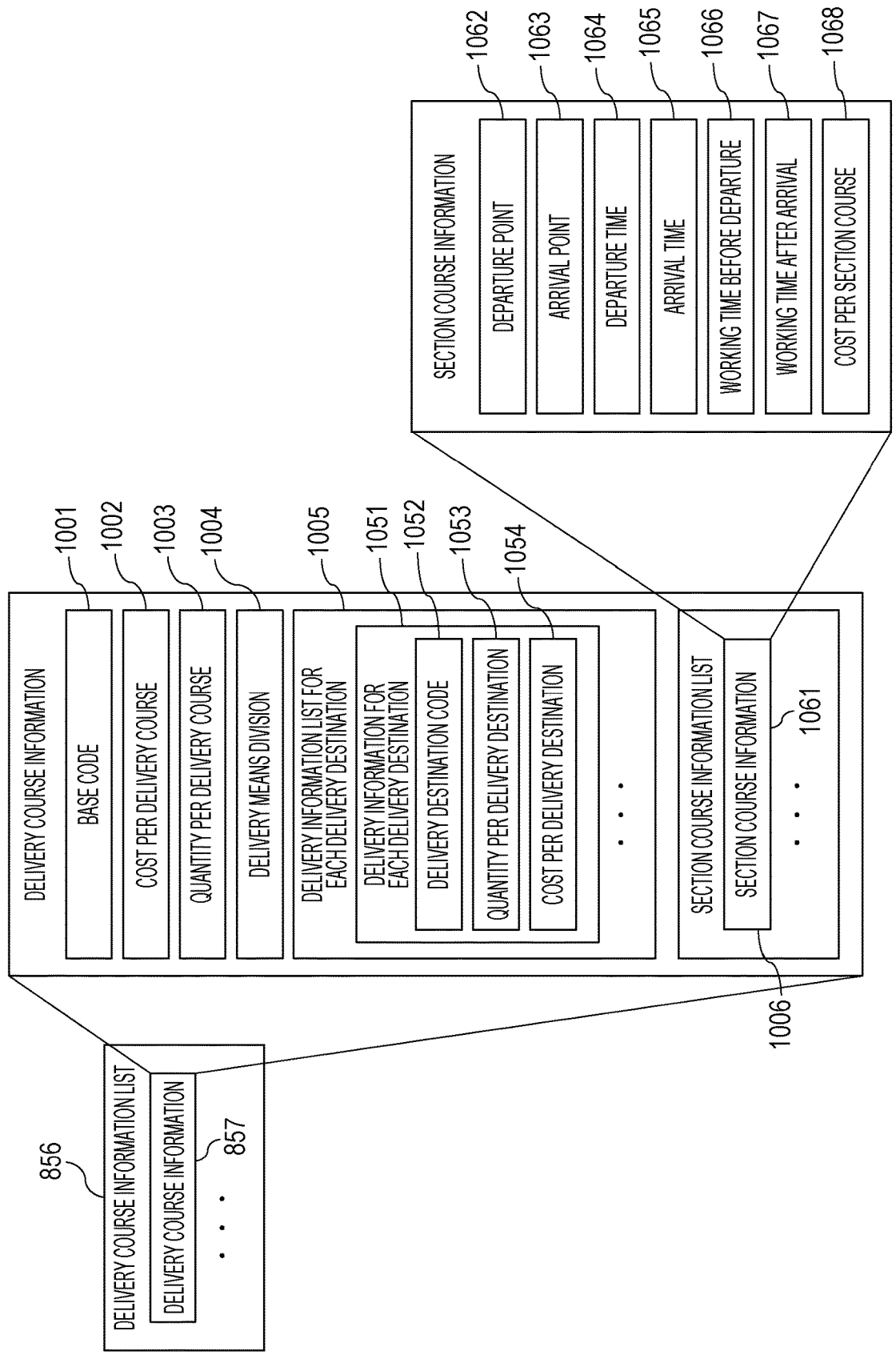
FIG. 10 is an explanatory diagram showing an example of the delivery course information shown in FIGS. 8 and 9.

FIG. 10 is an explanatory diagram showing an example of the delivery course information 857 shown in FIGS. 8 and 9. The delivery course information 857 is information on the delivery course by the selected delivery means. The delivery course information 857 includes a base code 1001, a cost per delivery course 1002, a quantity per delivery course 1003, a delivery means division 1004, a delivery information list for each delivery destination 1005, and a section course information list 1006.

The base code 1001 is the base code 421 of the base that is a sending source of the delivery course. The cost per delivery course 1002 is the cost for the delivery course on the delivery service (see FIG. 13). The quantity per delivery course 1003 is a delivery quantity on the delivery course in the delivery service. The delivery means division 1004 is information indicating the delivery means (route service, route delivery, or a mixture thereof) of the delivery service.

The delivery information list for each delivery destination 1005 is a set of delivery information for each delivery destination 1051. The delivery information for each delivery destination 1051 is the delivery information for each delivery destination from the base of the base code 1001. Specifically, for example, the delivery information for each delivery destination 1051 includes a delivery destination code 1052, a quantity per delivery destination 1053, and a cost per delivery destination 1054. The delivery destination code 1052 is the delivery destination code 201 of the delivery destination delivered by the delivery service that the delivery means is designated by the delivery means division 1004. The quantity per delivery destination 1053 is the quantity of cargo delivered for each delivery destination by the delivery service. In the case of the route service, the quantity per delivery destination 1053 has the same value as the quantity per delivery course 1003. The cost per delivery destination 1054 is the cost required for each delivery destination on the delivery service. In the case of the route service, the cost per delivery destination 1054 has the same value as the cost per delivery course 1002.

The section course information list 1006 is a set of section course information 1061. The section course information 1061 is information on a section course which is a course in which the delivery course is divided in units of departure and arrival from and at the base or the delivery destination. The section course information 1061 includes a departure point 1062, an arrival point 1063, a departure time 1064, an arrival time 1065, a working time before departure 1066, a working time after arrival 1067, and a cost per section course 1068.

The departure point 1062 is a departure position of a section course specified by the section course information 1061, and is designated by the base code 421 or the delivery destination code 201. The arrival point 1063 is an arrival position of a section course specified by the section course information 1061, and is designated by the base code 421 or the delivery destination code 201.

The departure time 1064 is a departure time from the departure point 701 specified by the section course information 700. The arrival time 1065 is an arrival time at the arrival point 702 specified by the section course information 700. The working time before departure 1066 is the loading time 454 of cargo at the departure point 701. The working time after arrival 1067 is the unloading time 243 of cargo at the arrival point 702. The cost per section course 1068 is the toll road fee for the section course. The total of the cost per delivery destination 1054 and the cost per section course 1068 becomes the cost per delivery course 1002.

Figure 11:
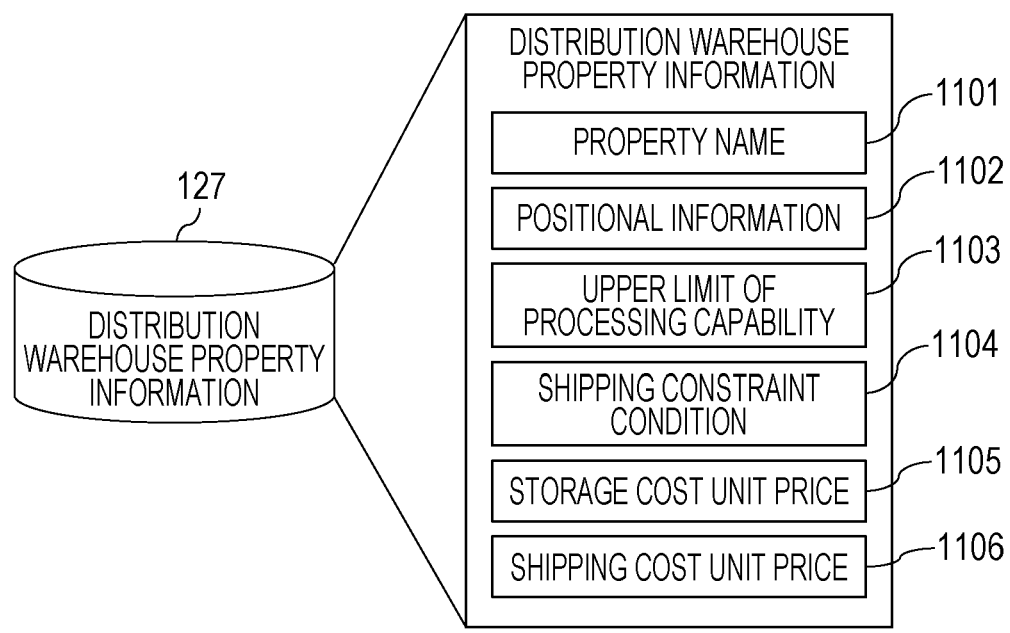
FIG. 11 is an explanatory diagram showing an example of distribution warehouse property information.

FIG. 11 is an explanatory diagram showing an example of the distribution warehouse property information 127. The distribution warehouse property information 127 is information on an existing distribution warehouse. The distribution warehouse property information 127 includes a property name 1101, positional information 1102, an upper limit of processing capability 1103, a shipping constraint condition 1104, a storage cost unit price 1105, and a shipping cost unit price 1106. The property name 1101 is information indicating a distribution warehouse name. The positional information 1102 is an address or latitude and longitude information indicating a seat of the distribution warehouse. The upper limit of processing capability 1103 is an upper limit of a quantity that can be shipped from the distribution warehouse. The shipping constraint condition 1104 is a condition for constraining the shipment from the distribution warehouse such as a shipping quantity or a shipping size of cargo, the delivery destination, and a shipping time.

The storage cost unit price 1105 is the unit price when storing cargo in the distribution warehouse. The storage cost is calculated by multiplying the processing quantity 842 by the storage cost unit price 1105. The shipping cost unit price 1106 is the unit price when shipping cargo from the distribution warehouse. The shipping cost is calculated by multiplying the processing quantity 842 by the shipping cost unit price 1106.

External Server 150

The geographic information server, which is an example of the external server 150, is a so-called geographic information system (GIS) server connected to the evaluation device 100 via a network. When the departure point 701, the arrival point 702, the positional information 203 and 423 of each point, and the calculation condition 731 are designated by the request from the evaluation device 100, the geographic information server creates the detailed course information 730 including the movement distance 732 along a road, the required time 733, and the course cost 734. In addition, the geographic information server may output a map image of the designated position and enlargement ratio to the evaluation device 100. The evaluation device 100 may acquire the detailed course information 730 in advance and store the acquired course information 730 in the course information list 125 of the memory device 102, and may acquire the detailed course information 730 from the geographic information server when determining the delivery schedule 832.

The distribution warehouse property information server is a server which holds the distribution warehouse property information 127 and outputs the distribution warehouse property information 127 in response to a request from the evaluation device 100. When the information acquired in advance is stored in the distribution warehouse property information 127 of the evaluation device 100, the evaluation device 100 can execute the base disposition evaluation without being connected to the distribution warehouse property information server.

Example of Input Screen

Figure 12:
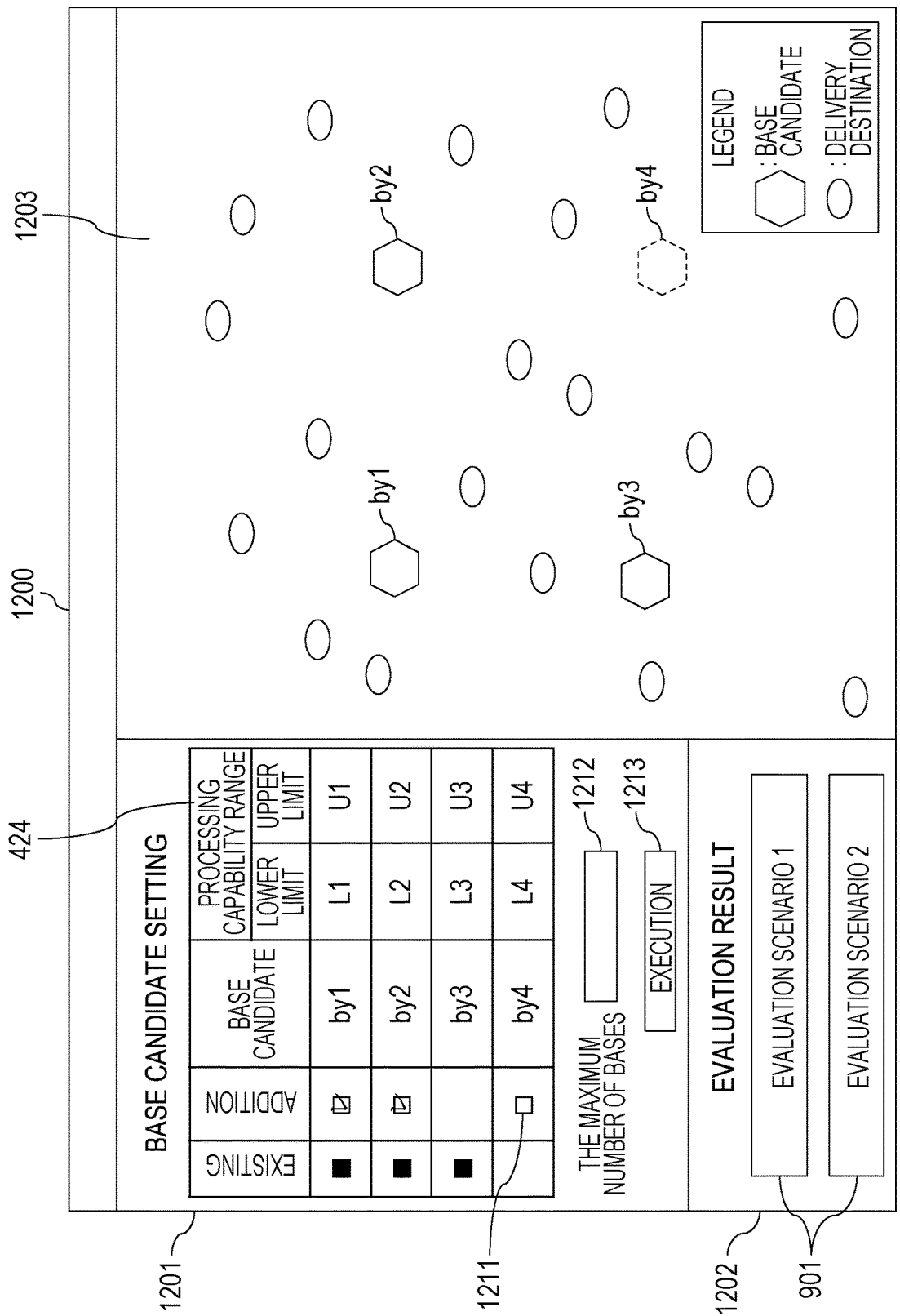
FIG. 12 is an explanatory diagram showing display screen example 1 of the evaluation device.

FIG. 12 is an explanatory diagram showing display screen example 1 of the evaluation device 100. A display screen 1200 has a base candidate setting region 1201, an evaluation result display region 1202, and a map information display region 1203. The base candidate setting region 1201 displays the base candidate and the processing capability range 424. When the existing base flag 461 of the base candidate is turned on, blackening square icons indicating pre-existing in the existing column are displayed. When it is desired to turn on the target base flag 462 of the base candidate, by checking in a check box 1211 in an additional column, the base candidate becomes the target base. A base candidate having no check box 1211 in the additional column is an essential base (the essential base flag 463 is turned on). In addition, within the processing capability range 424, the lower limit and the upper limit can be changed from the input device 103.

By the input from the input device 103, the maximum number of bases is set in an entry field 1212. When an execution button 1213 is pressed by the input from the input device 103, the evaluation of the base disposition 831 is executed with the contents of the base candidate setting.

In the evaluation result display region 1202, zero or more evaluation scenarios 901 are displayed. By designating the evaluation scenario 901 by the input from the input device 103, details of the evaluation scenario 901 are displayed. In the map information display region 1203, the base candidate set in the base candidate setting region 1201 and the delivery destination are displayed.

Cost Calculation Example

Figure 13:
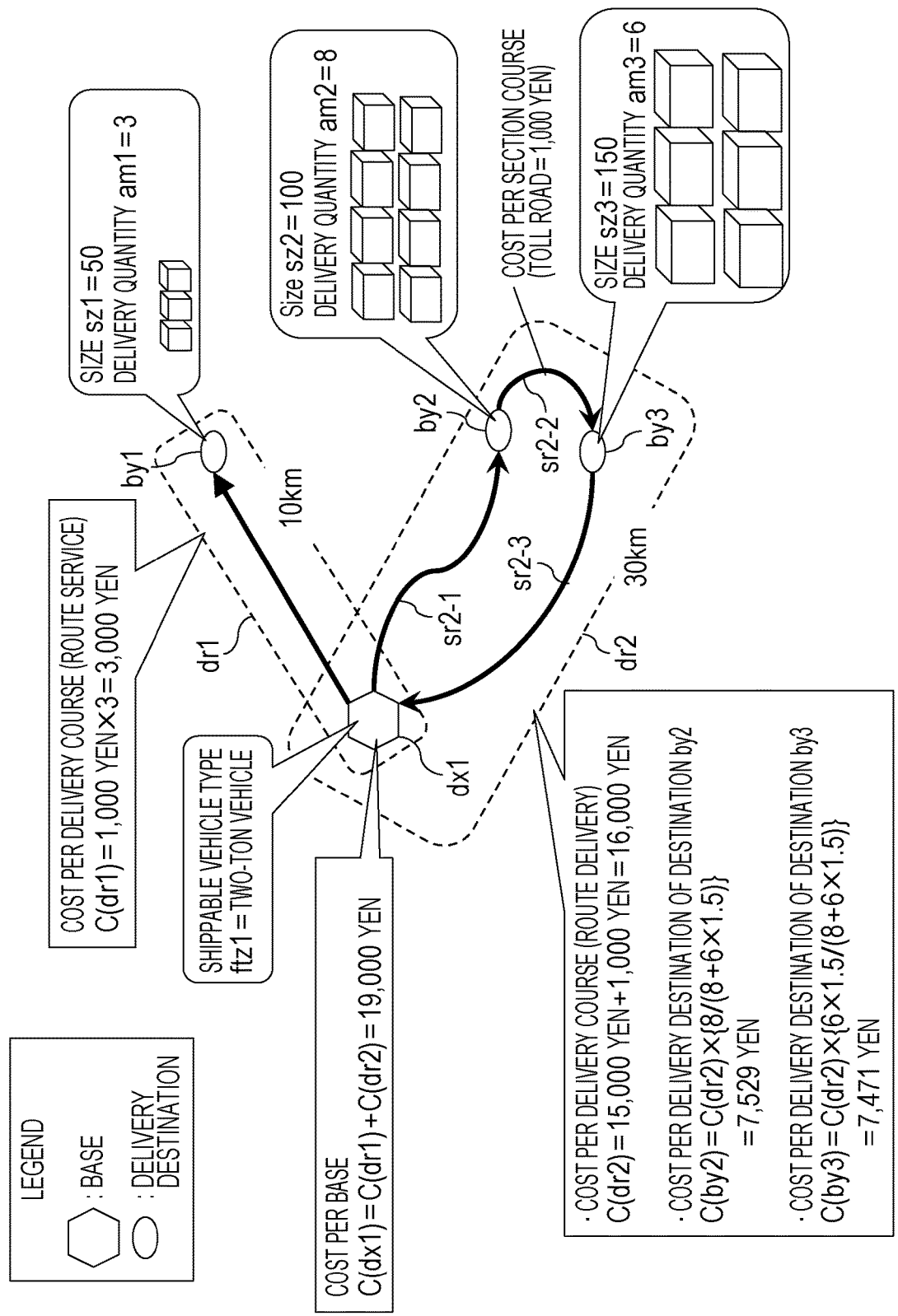
FIG. 13 is an explanatory diagram showing a cost calculation example.

FIG. 13 is an explanatory diagram showing a cost calculation example. In order to simplify the explanation, the explanation will be made using a base dx1 and delivery destinations by1 to by3. In addition, a delivery service dr1 from the base dx1 to the delivery destination by1 is defined as the route service, and a delivery service dr2 returning from the base dx1 to the base dx1 via the delivery destinations by2 and by3 is defined as the route delivery.

First, the delivery service dr1 (route service) will be described. The movement distance 732 from the base dx1 to the delivery destination by1 is set to be 10 km, the size of cargo delivered to the delivery destination by1 is set to be 50 (sz1=50), and the delivery quantity of cargo is set to be 3 (am1=3). By referring to the route service tariff 124A1, a value C(dr1) of the cost per delivery course 1002 in the delivery service dr1 (route service) becomes 3,000 yen by multiplying three delivery quantities by cost per one 1,000 yen.

Next, the delivery service dr2 (route delivery) will be described. A value ftz1 of the shippable vehicle type 452 at the base dx1 is a two-ton vehicle. The size of cargo delivered to the delivery destination by2 is set to be 100 (sz2=100), and the delivery quantity of cargo is set to be 8 (am2=8). The size of cargo delivered to the delivery destination by3 is set to be 150 (sz3=150), and the delivery quantity of cargo is set to be 6 (am3=6). The movement distance 732 of the delivery service dr2 (route delivery) is set to be 30 km. The delivery service dr2 (route delivery) includes three section courses sr2-1, sr2-2, and sr2-3. Among them, the section course sr2-2 is a toll road, and the toll road fee is 1,000 yen.

A value C(dr2) of the cost per delivery course 1002 in the delivery service dr2 (route delivery) becomes 16,000 yen by adding a toll road fee 1,000 yen of the section course sr2-2 to 15,000 yen obtained by the route delivery tariff 124B1.

In addition, the value C(by2) of the cost per delivery destination 1054 of the delivery destination by2 is as follows. In the following formula, "1.5" is the weight of the size (1.5=150/100).

$C(by2)=C(dr2)\times\{8/(8+6\times1.5)\}=7{,}529$ yen

In addition, the value C(by3) of the cost per delivery destination 1054 of the delivery destination by3 is as follows. In the following formula, "1.5" is the weight of the size (1.5=150/100).

$C(by3)=C(dr2)\times\{6\times1.5/(8+6\times1.5)\}=7{,}471$ yen

In addition, the value C(dx1) of the cost per base 855 of the base dx1 is 19,000 yen (==C(dr1)+C(dr2)).

Evaluation Processing Procedure Example

Figure 14:
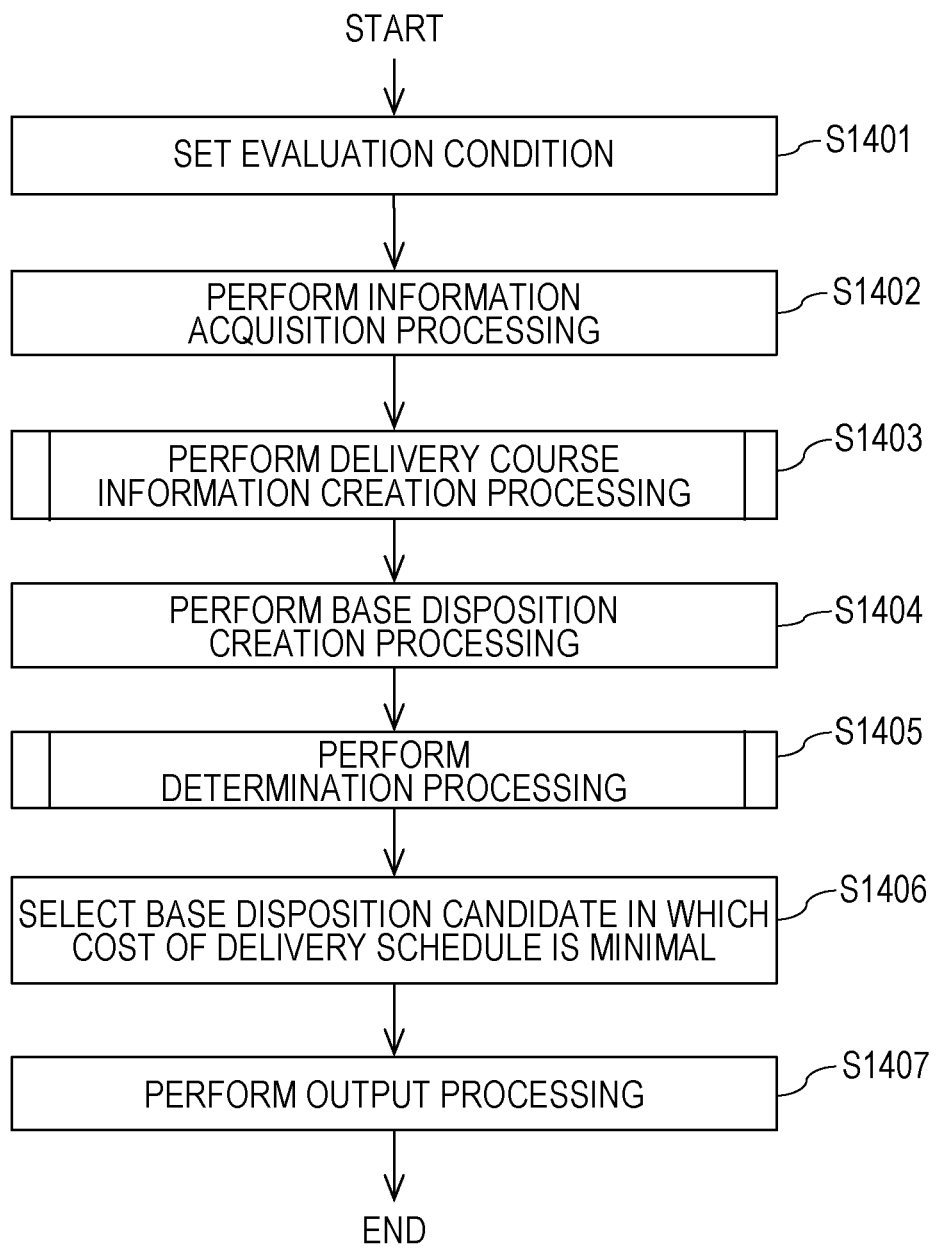
FIG. 14 is a flowchart showing an evaluation processing procedure example by the evaluation device.

FIG. 14 is a flowchart showing an evaluation processing procedure example by the evaluation device 100. The evaluation device 100 sets an evaluation condition 811 (step S1401). Specifically, for example, the evaluation device 100 receives the evaluation condition 811 (for example, the maximum number of bases, the setting contents (existing base flag 461, target base flag 462, essential base flag 463) of the base constraint condition 426, and presence or absence of a toll road) by the operation of the input device 103 of the user, thereby setting the evaluation condition 811 in the temporary information for evaluation 801 of the evaluation related information 126.

Next, the evaluation device 100 executes information acquisition processing (step S1402). Specifically, for example, the evaluation device 100 reads the delivery destination information 121, the demand information list 122, the route service tariff 124A1, the route delivery tariff 124B1, the course information list 125, and the base information list 420.

Next, the evaluation device 100 executes delivery course information creation processing (step S1403). The delivery course information creation processing (step S1403) is processing of creating the delivery course information 700, and details thereof will be described below with reference to FIG. 15.

Next, the evaluation device 100 executes base disposition creation processing (step S1404). In the base disposition creation processing (step S1404), the base disposition 831 is created by combining all the bases set as the target by the target base flag 462 in the base information 400 included in the base information list 420, and is stored as the base disposition candidate 813. At this time, when the essential base flag 463 included in the base information 400 is set to be essential, the evaluation device 100 creates the base disposition 831 necessarily including the base. In addition, when the upper limit of the number of selected bases is set in the evaluation condition 811, the base disposition 831 including the base which is at least one and the upper limit or less is created.

Next, the evaluation device 100 executes determination processing (step S1405). In the determination processing (step S1405), under various constraint conditions, the allocation of the delivery destination in which the cost 833 of the delivery schedule 832 is the first and the delivery means (the type of delivery service) are determined for each base disposition candidate 813. Specifically, for example, in the determination processing (step S1405), the allocation to the base of the delivery destination and the circulation order of the delivery destination are determined by using an optimization algorithm so that all delivery destinations to be allocated are circulated at as low cost as possible. As a result, a delivery service of either the route service or the route delivery is allocated to all delivery destinations to be allocated. Details of the determination process (step S1405) will be described later with reference to FIG. 16.

Next, the evaluation device 100 selects the base disposition candidate 813 having the minimum cost 833 of the delivery schedule 832 from the base disposition candidate 813 group determined in step S1404 (step S1406).

Next, the evaluation device 100 executes output processing (step S1407). Specifically, for example, the evaluation device 100 combines the evaluation condition 811, the base candidate information 123, and the base disposition candidate 813 (base disposition 831, delivery schedule 832, and cost 833) specified in step S1406 to create the evaluation scenario 901 and add the created evaluation scenario 901 to the evaluation scenario list 802. In addition, the evaluation device 100 disposes an icon indicating a delivery destination and an icon indicating a base selected in the base disposition 831 in the map information display region 1203, creates a map image in which the allocations of each base and each delivery destination are connected by an allocation line, and outputs the created map image on the display screen 1200.

As a result, it is possible to plan the position and the delivery means of the distribution base and the base disposition 831 and the delivery schedule 832 in which all the delivery courses are optimized. In the output processing (step S1407), the example in which the created image is displayed on the display screen 1200 of the output device 104 has been described, but the evaluation device 100 may transmit the created image to an external device capable of displaying the created image.

Delivery Course Information Creation Processing
(Step S1403)

Figure 15:
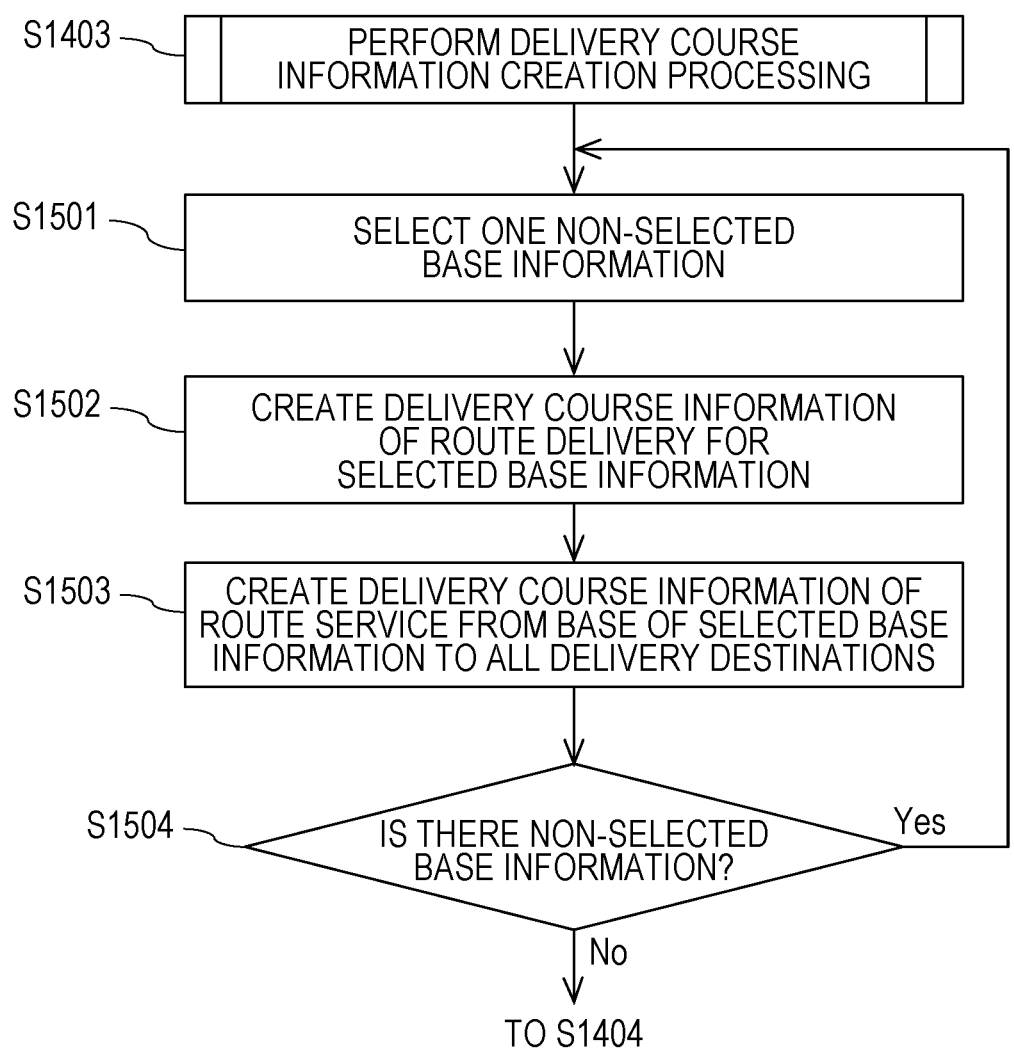
FIG. 15 is a flowchart showing a detailed processing procedure example of delivery course information creation processing (step S1403) shown in FIG. 14.

FIG. 15 is a flowchart showing a detailed processing procedure example of delivery course information creation processing (step S1403) shown in FIG. 14. First, the evaluation device 100 selects one non-selected base information 400 satisfying the base constraint condition 426 from the base information list 420 (step S1501). Specifically, for example, as shown in FIG. 8, the evaluation device 100 stores the selected base information 400 in the selected base information list 840 of the base disposition 831 of the base disposition candidate 813 in the temporary information for evaluation 801.

Next, the evaluation device 100 creates the delivery course information 857 of the route delivery for the selected base information 841 (step S1502). Specifically, for example, the evaluation device 100 refers to the delivery destination information 121, the demand information list 122, the course information list 125, and the base information 400 of the base selected as the selected base information 841. The evaluation device 100 determines the allocation of the delivery destination and the circulation order of the delivery destination by using the optimization algorithm so that all the delivery destinations are circulated as low cost as possible within the range satisfying the delivery constraint condition 204 of the delivery destination, the shipping constraint condition 425 of the selected base, and the delivery condition 124B2 of the route delivery information 124B.

Here, as the optimization algorithm, for example, a 2-opt method which is one of meta-heuristic methods is adapted. The evaluation device 100 creates a population in which all the delivery destination information 121 is arranged in random order. Next, the evaluation device 100 acquires the delivery destination information 121 in order from a head of the population, and groups the delivery destinations within the range that can be delivered on the same track. Specifically, for example, the evaluation device 100 determines whether the delivery can be performed on the same track based on whether the loading capacity and the required time 733 fall within the range of the reference value.

With respect to the loading capacity, the evaluation device 100 acquires the demand information using the delivery destination code 201 included in the delivery destination information 121 as a key, and calculates the loading capacity for the delivery destination using the delivery quantity and the size. The evaluation device 100 compares the loading capacity with the loading capacity 604 until the loading capacity exceeds the loading capacity 604 (reference value) included in the delivery condition of the route delivery, while sequentially adding the loading capacity to the delivery destination.

With respect to the required time 733, the evaluation device 100 specifies from the course information list 125 the course information 700 which includes the selected base specified as the departure point 701, the first delivery destination specified as the arrival point 702, and the time obtained by adding the loading time 454 of the selected base to the start time of the shippable time period 451 of the selected base specified as the calculation condition 731. The evaluation device 100 acquires the required time 733 within the specified course information 700.

The time when the required time 733 has elapsed from the start time of the shippable time period 451 within the base information 400 of the selected base is earlier than the start time of the deliverable time period 241 in the delivery destination information 121 at a first delivery destination, the evaluation device 100 determines as the departure time of the selected base the earlier one of the time retraced from the required time 733 from the start time of the deliverable time period 241 in the delivery destination information 121 of the first delivery destination and the end time of the shippable time period 451 within the base information 400 of the selected base.

In addition, the evaluation device 100 adds the unloading time 243 within the delivery destination information 121 of the first delivery destination to the arrival time of the first delivery destination. For the second and subsequent delivery destinations, the evaluation device 100 similarly acquires the required time 733 with the previous delivery destination as the departure point 701 and the next delivery destination as the arrival point 702, and compares the required time 733 with a time (reference value) until the required time 733 exceeds the time (reference value) obtained by subtracting the break time 602 of the defined number of times from the maximum operation time 601 included in the delivery condition 124B2 of the route delivery information 124B while sequentially adding the unloading time 243 to the required time 733.

In the comparison of the loading capacity and the required time 733, when any of the values exceeds the reference value, the evaluation device 100 sets as a group of the same track a delivery destination one before a delivery destination exceeding the reference value and previous delivery destinations, and executes grouping processing of setting the delivery destination exceeding the reference value as a first element of the next group. The evaluation device 100 repeatedly executes the grouping processing.

When the grouping of all delivery destinations is completed, the delivery cost obtained from the route delivery tariff 124B1 and the course cost 734 relating to the course between the base and the delivery destination included in the group are summed based on the sum of the required time 733 relating to each group or the total movement distance, and the sum is set as the delivery cost of this population.

Next, the evaluation device 100 randomly selects two delivery destinations in the population, sets a replacement population after replacing the two delivery destinations as a new population, and calculates the delivery cost by the above procedure. When the delivery cost of the new population after the replacement falls below the distribution cost of the population before the replacement, the evaluation device 100 adopts the delivery cost of the new population after the replacement. On the other hand, when the delivery cost of the new population after the replacement exceeds the distribution cost of the population before the replacement, the evaluation device 100 repeats a processing of returning the replacement of the two delivery destinations to the original state, randomly selecting two delivery destinations again, and forming a new population. The repetition end condition is, for example, an end condition at a predetermined specified time.

The evaluation device 100 adopts the grouping of the delivery destination at the endpoint as the delivery schedule 832 of the route delivery when delivering from the selected base to all the delivery destinations, creates the delivery course information 857 for each group, and stores the delivery course candidate 812. At this time point, the section course information 1061 included in the delivery course information 857 has only the departure point 1062, the arrival point 1063, and the cost per section course 1068. The evaluation device 100 uses, as the cost per section course 1068, the course cost 734 of the course information 700 obtained from the course information list 125 with the departure point 1062 and the arrival point 1063 as keys. In addition, the evaluation device 100 calculates the cost per delivery course 1002 by referring to the route delivery tariff 124B1 and the cost per section course 1068. In addition, as shown in FIG. 13, the evaluation device 100 distributes the cost per delivery course 1002 by the quantity per delivery destination 1053 to be delivered to each delivery destination, and stores the distributed cost as the cost per delivery destination 1054.

Next, the evaluation device 100 creates the delivery course information 700 of the route service from the base of the selected base information 400 to all the delivery destinations (step S1503). Specifically, for example, the evaluation device 100 calculates the cost per delivery course 1002 by referring to the route service tariff 124A1. In the case of the route service, the evaluation device 100 stores the value of the cost per delivery course 1002 as the cost per delivery destination 1054 as it is.

Next, the evaluation device 100 determines whether there is the non-selected base information 400 (step S1504) and if there is non-selected base information 400 (step S1504: Yes), the processing returns to step S1501. On the other hand, if there is no non-selected location information 400 (step S1504: No), the processing proceeds to step S1404.

In FIG. 15, although the example of executing the creation of the delivery course information 700 of only the route delivery (step S1502) and the creation of the delivery course information 700 of only the route service (step S1503) has been described, the processing of creating the delivery course information 857 in which the route delivery and route service are mixed may also be added. Specifically, for example, the evaluation device 100 creates the delivery course in which cargo passes via another base dx2 in the route delivery delivered from the base dx1 to be delivered from the other base dx2 by the route service.

Determination Processing (Step S1405)

Figure 16:
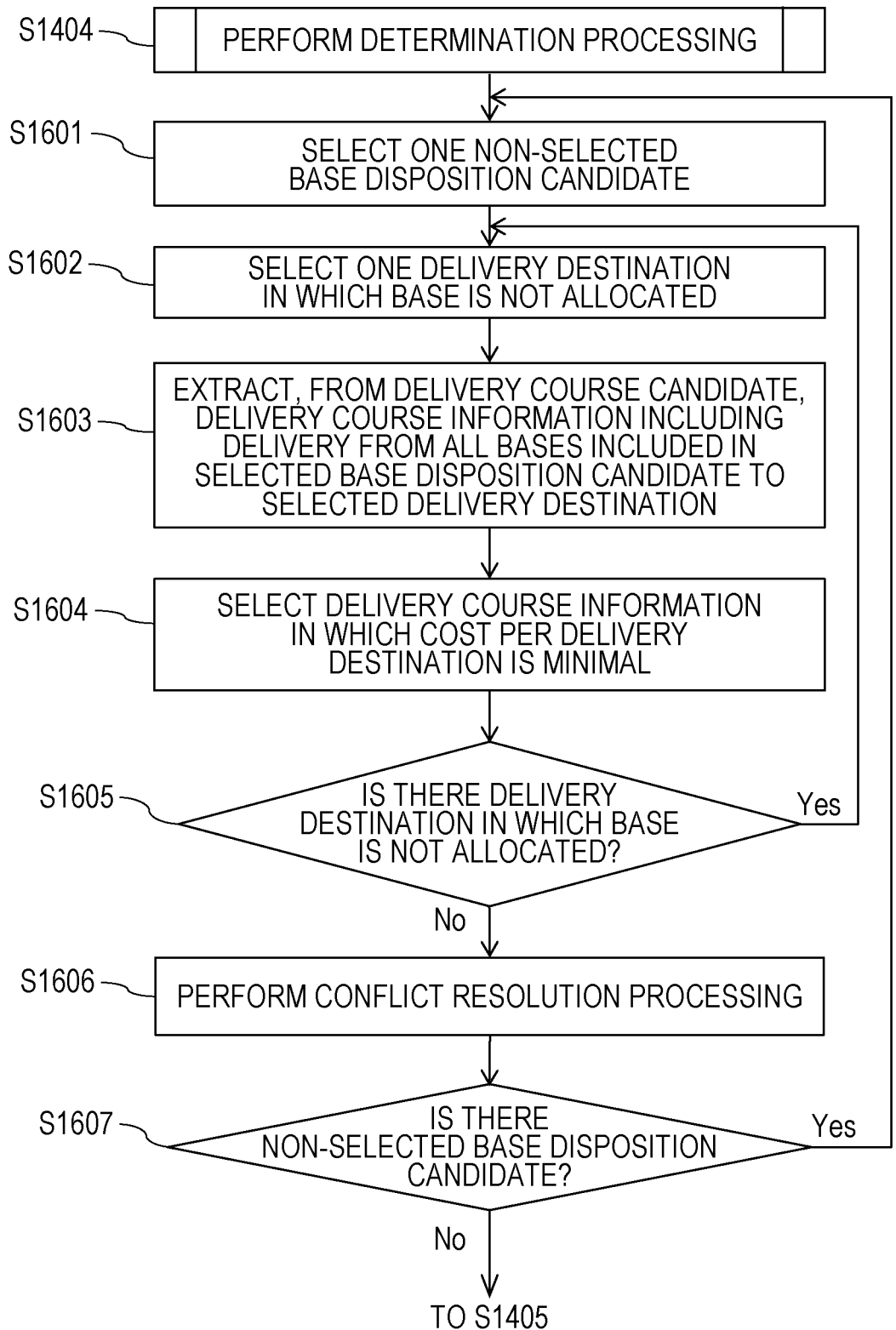
FIG. 16 is a flowchart showing a detailed processing procedure example of determination processing (step S1405) shown in FIG. 14.

FIG. 16 is a flowchart showing a detailed processing procedure example of determination processing (step S1405) shown in FIG. 14. The determination processing (step S1405) is a processing of finding out from which base and by which delivery means to perform delivery to each delivery destination to reduce costs as much as possible.

The evaluation device 100 selects one non-selected base disposition candidate 813 within the temporary information for evaluation 801 (step S). Next, the evaluation device 100 selects one delivery destination to which the base is not allocated (step S1602). The evaluation device 100 extracts from the delivery course candidate 812 all the delivery course information 857 (route delivery and route service) including the delivery from the base of the selected base information 841 included in the selected base information list 840 of the selected base disposition candidate 813 to the selected delivery destination (step S1603). The evaluation device 100 stores the extracted delivery course information 857 in the delivery course information list 856 included in the delivery schedule 832 in the base disposition candidate 813.

The evaluation device 100 acquires from each of the delivery course information 857 included in the delivery course information list 856 the delivery destination delivery information 1051 including the delivery destination code 201 of the selected delivery destination, and the delivery course information 857 in which the cost per delivery destination 1054 becomes minimal is selected (step S1604). As a result, the evaluation device 100 can select the base of the base code 421 included in the selected delivery course information 857 as the delivery source to the selected delivery destination, and select any one of the route service or the route delivery by the delivery means division 1004 included in the delivery course information 857 selected as the delivery means.

Here, with respect to the delivery course information 857 included in all the delivery course information lists 856 other than the delivery course information 857 selected in step S1604, the evaluation device 100 deletes the delivery information for each delivery destination 1051 relating the delivery destination selected in step S1602 from the delivery information list for each delivery destination 1005. When the number of delivery information for each delivery destination 1051 becomes 0 by this processing, the delivery course information 857 is deleted. By this processing, it is possible to prevent each delivery destination from being included in the plurality of delivery course information 857 in the delivery course information list 856.

Next, the evaluation device 100 determines whether there is the delivery destination to which the base is not allocated (step S1605). When there is the delivery destination to which the base is not allocated (step S1605: Yes), the processing returns to step S1602. On the other hand, if there is no delivery destination to which the base is not allocated (step S1605: No), the evaluation device 100 executes conflict resolution processing (step S1606). The conflict resolution processing (step S1606) is a processing of passing via the delivery destination in only one of the delivery services, and re-allocating so as not to pass via the delivery destination in the remaining delivery services when there is the delivery destination that is commonly passed among a plurality of delivery services having different bases.

Specifically, for example, in the conflict resolution processing (step S1606), the evaluation device 100 adopts the 2-opt method as in step S1403, for example. However, in the conflict resolution processing (step S1606), the evaluation device 100 refers to the number of berths 453 of the base information 400 when determining the departure time 1064 of the targeted base. When the number of trucks to be loaded at the same time exceeds the number of berths 453, the evaluation device 100 shifts back the departure time 1064 of the targeted base so that the number of trucks to be loaded at the same time does not exceed the number of berths 453.

In addition, the evaluation device 100 recalculates the cost per delivery course 1002 of the delivery course information 857. The evaluation device 100 determines as the cost per base 855 of the targeted base a value obtained by adding the cost per delivery course 1002 of the delivery course information 857 in which targeted base is the sending source. In addition, the evaluation device 100 stores the value obtained by adding the cost per base 855 of all bases selected in the base disposition candidate 813 as the cost 833 of the base disposition candidate 813 in the base disposition candidate 813 of the temporary information for evaluation 801.

Finally, the evaluation device 100 determines whether there is the non-selected base disposition candidate 813 (step S1607). When there is the non-selected base disposition candidate 813 (step S1607: Yes), the processing returns to step S1601. When there is no non-selected base disposition candidate 813 (step S1607: No), the processing proceeds to step S1405.

Example of Conflict Resolution

An example of conflict resolution in conflict resolution processing (step S1606) will be described with reference to FIGS. 17 to 22.

Figure 17:
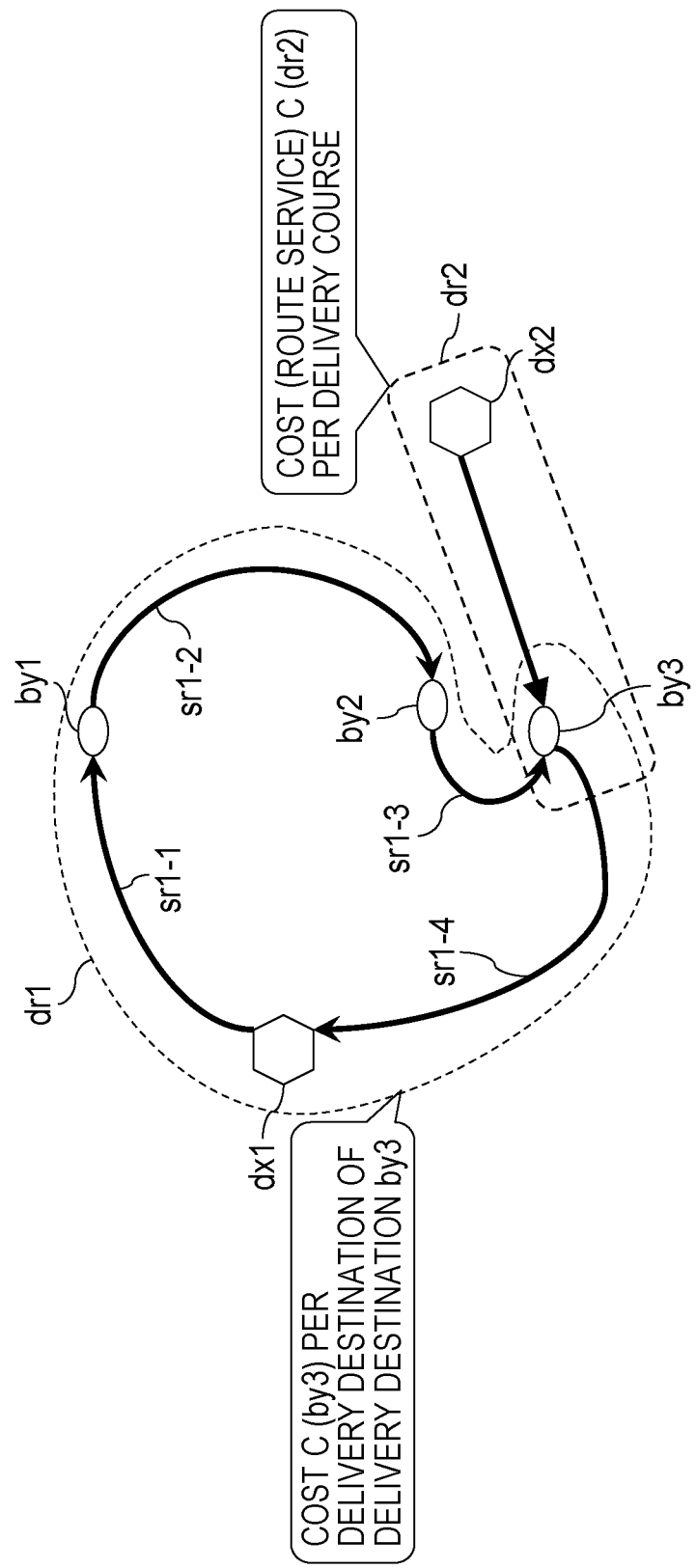
FIG. 17 is a first explanatory diagram showing conflict resolution example 1.

FIG. 17 is a first explanatory diagram showing conflict resolution example 1. FIG. 17 shows the state before the conflict resolution. In FIG. 17, the delivery service dr1 is the route delivery and the delivery service dr2 is the route service. The delivery service dr1 is a route delivery which returns from the base dx1 to the base dx1 via the delivery destinations by1, by2, and by3. The base dx1 and the delivery destination by1 are connected by a section course sr1-1. The delivery destination by1 and the delivery destination by2 are connected by a section course sr1-2. The delivery destination by2 and the delivery destination by3 are connected by a section course sr1-3. The delivery destination by3 and the base dx1 are connected by a section course sr1-4.

The delivery service dr2 is a route service which performs delivery from the base dx2 to the delivery destination by3. The base dx1 of the delivery service dr1 and the base dx2 of the delivery service dr2 are different and pass via the common destination by3. Since the delivery destination by3 may be supplied with cargo by any one of the delivery services dr1 and dr2, the evaluation device 100 compares the value C(by3) of the cost per delivery destination 1054 of the delivery destination by3 in the delivery service dr1 with the value C(dr2) of the cost per delivery destination 1054 in the route service in the delivery service dr2. The evaluation device 100 selects the cheaper one of the cost C(by3) and the cost C(dr2).

Figure 18A:
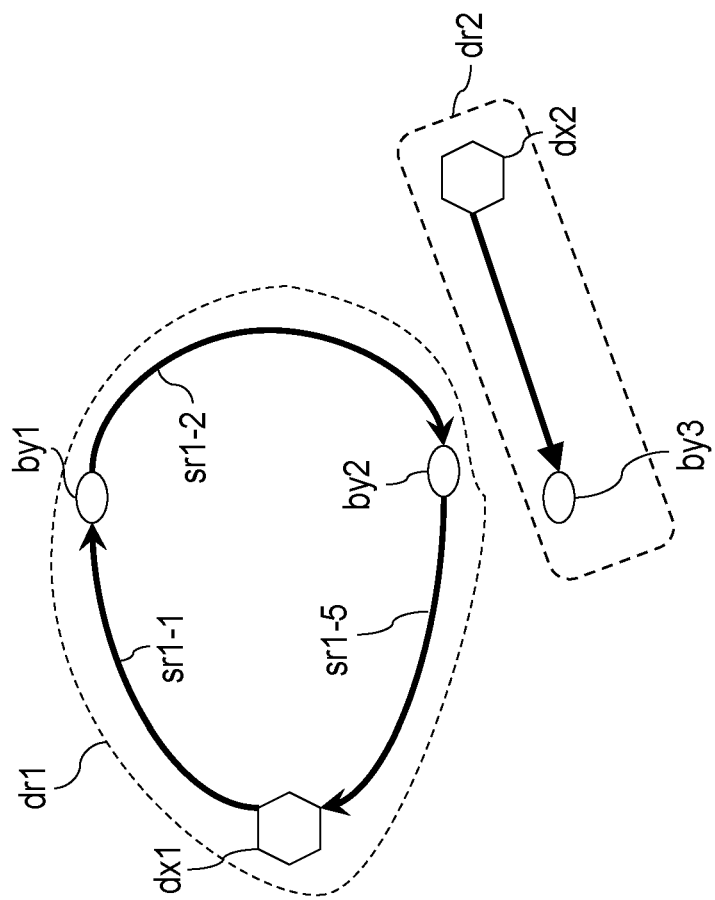
FIGS. 18A and 18B are second explanatory diagrams showing the conflict resolution example 1.
Figure 18B:
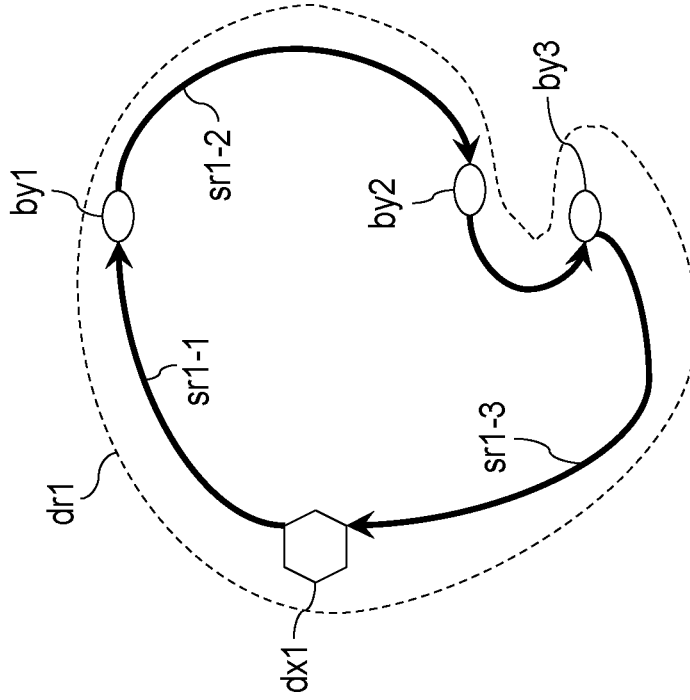

FIG. 18 is a second explanatory diagram showing the conflict resolution example 1. FIG. 18 shows the state after the conflict resolution. In FIG. 18, (A) is a selection example when the cost C(by3) is cheaper. Since the evaluation device 100 selects the delivery service dr1, the delivery service dr2 (route service) is deleted. That is, cargo is not delivered from the base dx2 to the delivery destination by3. (B) is a selection example when the cost C(dr2) is cheaper. Since the delivery service dr2 is selected, the evaluation device 100 recalculates the delivery service dr1 (route delivery) so that the delivery service dr1 does not go via the delivery destination by3. In the delivery service dr1, the evaluation device 100 connects the delivery destination by2 and the base dx1 by a section course sr1-5. As a result, the conflict of the delivery destination by3 is resolved.

Figure 19:
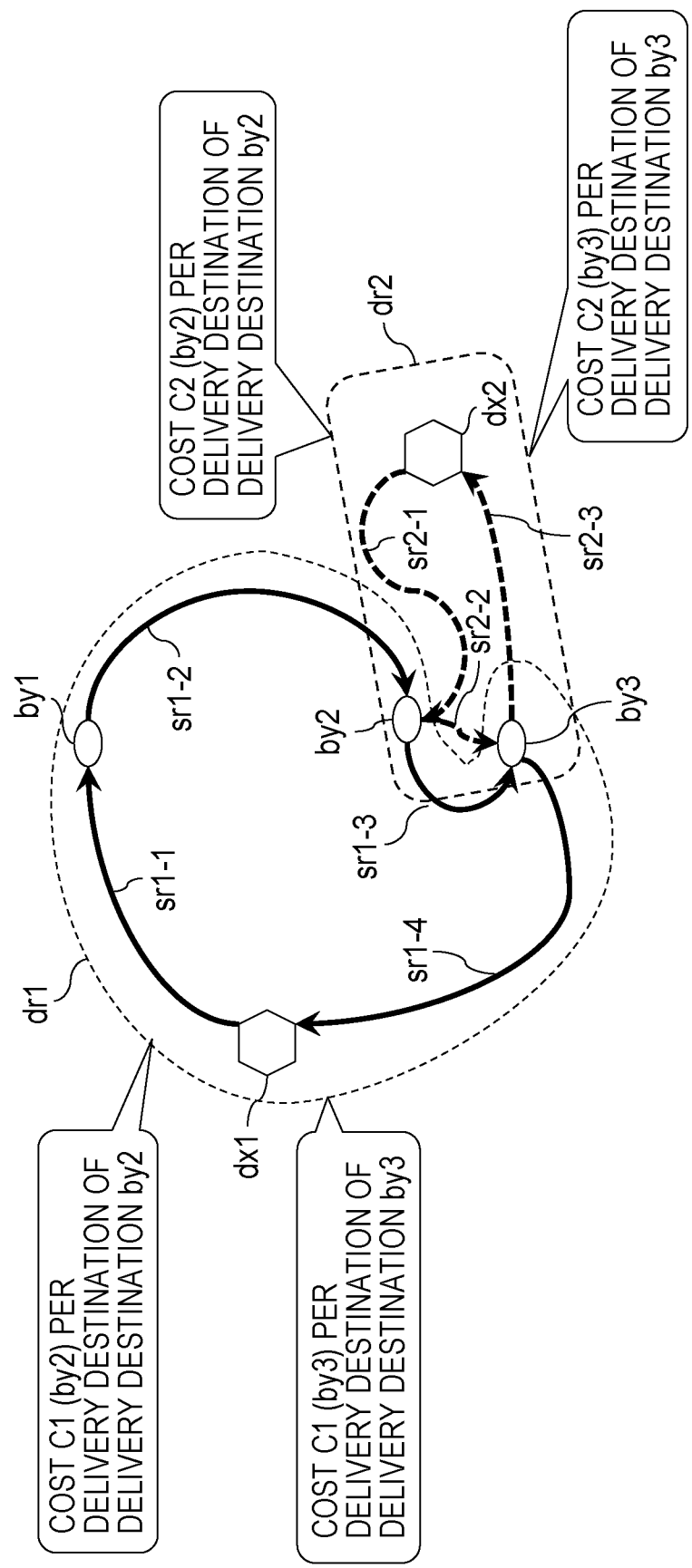
FIG. 19 is a first explanatory diagram showing conflict resolution example 2.

FIG. 19 is a first explanatory diagram showing conflict resolution example 2. FIG. 19 shows the state before the conflict resolution. In FIG. 19, both the delivery services dr1 and dr2 are the route delivery. The delivery service dr1 is the same delivery service as the delivery service dr1 in FIG. 17. The delivery service dr2 is a route delivery which returns from the base dx2 to the base dx2 via the delivery destinations by2, and by3. The base dx2 and the delivery destination by2 are connected by a section course sr2-1. The delivery destination by2 and the delivery destination by3 are connected by a section course sr2-2. The delivery destination by3 and the base dx2 are connected by a section course sr2-3.

The base dx1 of the delivery service dr1 and the base dx2 of the delivery service dr2 are different and pass via the common destinations by2 and by3. The delivery destinations by2 and by3 may be supplied with cargo by any one of the delivery services dr1 and dr2. Therefore, the evaluation device 100 compares the total C1 of the value C1 (by2) of the cost per delivery destination 1054 of the delivery destination by2 and the value C1 (by3) of the cost per delivery destination 1054 of the delivery destination by3 in the delivery service dr1 with the total C2 of the value C2 (by2) of the cost per delivery destination 1054 of the delivery destination by2 and the value C2 (by3) of the cost per delivery destination 1054 of the delivery destination by3 in the delivery service dr2. The evaluation device 100 selects the cheaper delivery service of the total C1 of costs and the total C2 of cost.

Figure 20B:
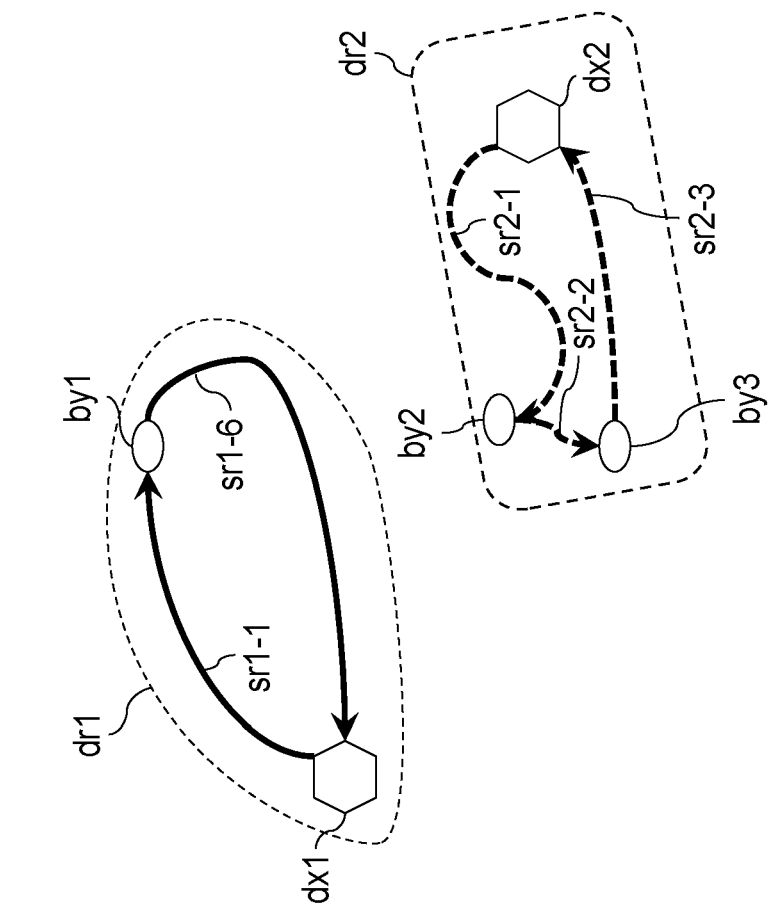
FIGS. 20A and 20B are second explanatory diagrams showing the conflict resolution example 2.
Figure 20A:
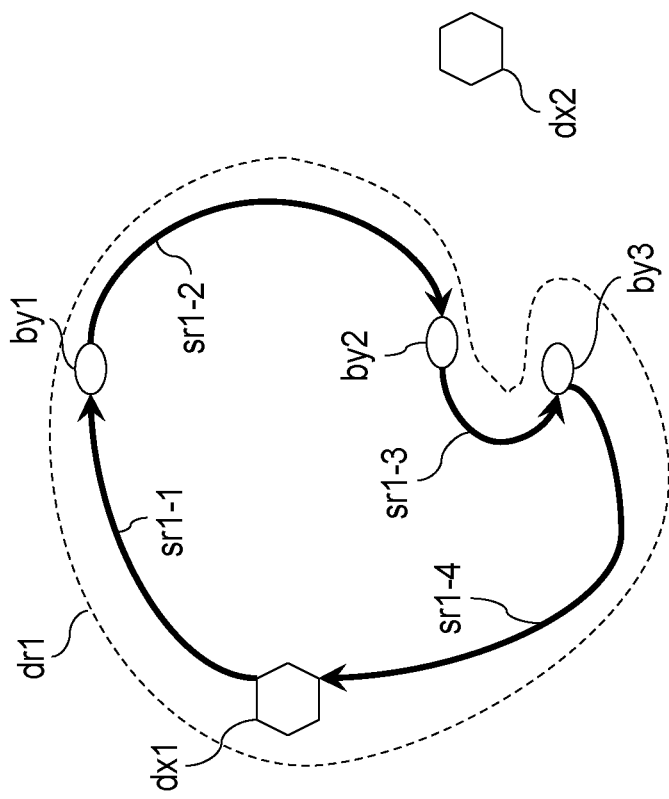

FIG. 20 is a second explanatory diagram showing the conflict resolution example 2. FIG. 20 shows the state after the conflict resolution. In FIG. 20, (A) is a selection example when the total C1 of costs is cheaper. Since the evaluation device 100 selects the delivery service dr1, the delivery service dr2 is deleted. That is, cargo is not delivered from the base dx2 to the delivery destinations by2 and by3. (B) is a selection example when the total C2 of costs is cheaper. Since the delivery service dr2 is selected, the evaluation device 100 recalculates the delivery service dr1 (route delivery) so that the delivery service dr1 does not pass via the delivery destinations by2 and by3. In the delivery service dr1, the evaluation device 100 connects the delivery destination by1 and the base dx1 by a section course sr1-6. As a result, the conflict of the delivery destinations by2 and by3 is resolved.

Figure 21:
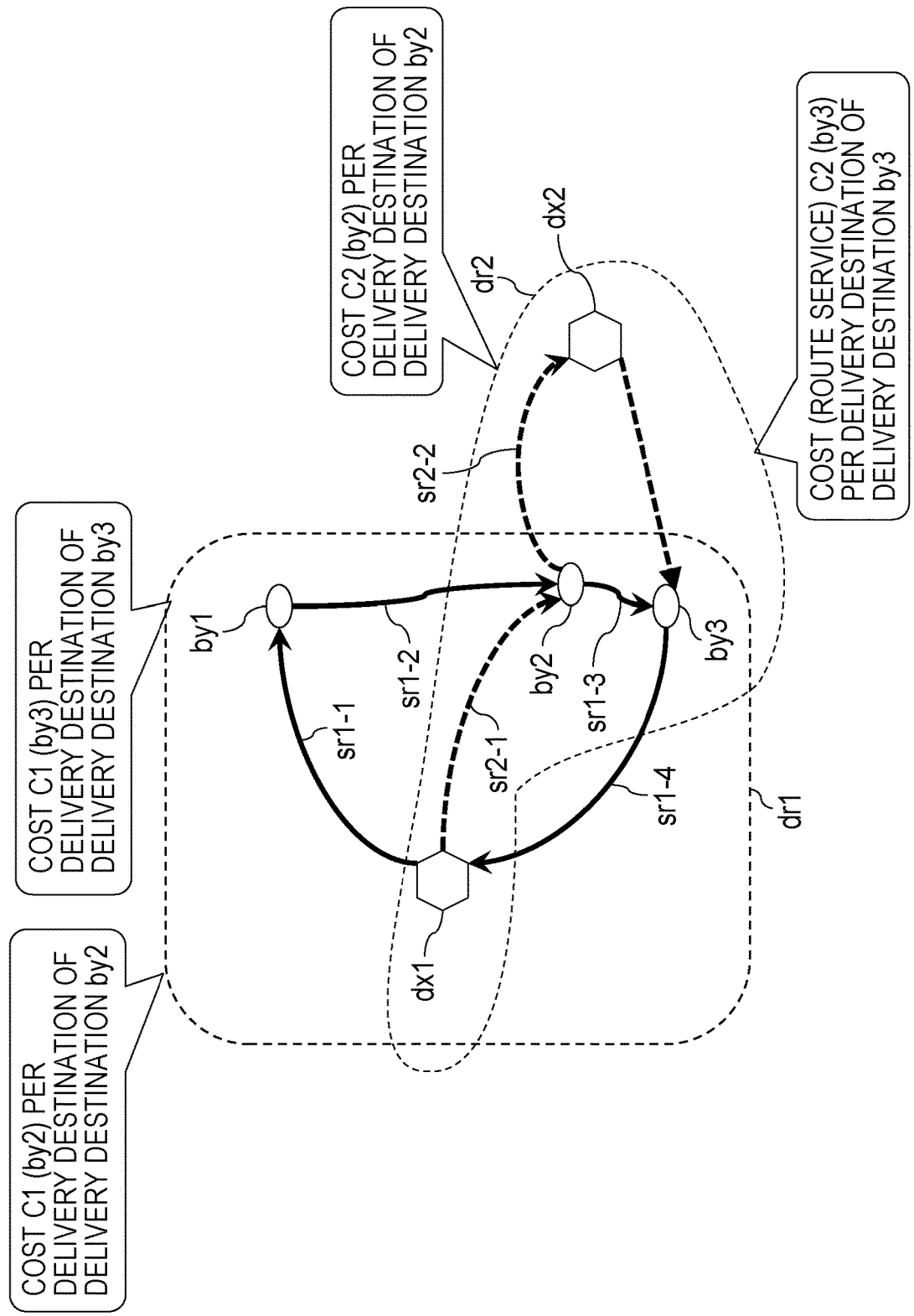
FIG. 21 is a first explanatory diagram showing conflict resolution example 3.

FIG. 21 is a first explanatory diagram showing conflict resolution example 3. FIG. 21 shows the state before the conflict resolution. In FIG. 21, the delivery service dr1 is the route delivery. The delivery service dr1 is the same delivery service as the delivery service dr1 in FIG. 17. The delivery service dr2 is a delivery service in which the route delivery and the route service are mixed. The delivery service dr2 is a delivery service including a route delivery which arrives at the base dx2 from the base dx1 via the delivery destinations by1 and by2 and a route service which arrives at the delivery destination by2 from the base dx2. The delivery destination by1 and the base dx2 are connected by a section course sr2-2. The base dx2 and the delivery destination by2 are connected by a section course sr2-3.

The base dx1 of the delivery service dr1 and the base dx2 of the delivery service dr2 are different and pass via the common destinations by2 and by3. The delivery destinations by2 and by3 may be supplied with cargo by any one of the delivery services dr1 and dr2. Therefore, the evaluation device 100 compares the total C1 of the value C1 (by2) of the cost per delivery destination 1054 of the delivery destination by2 and the value C1 (by3) of the cost per delivery destination 1054 of the delivery destination by3 in the delivery service dr1 with the total C2 of the value C2 (by2) of the cost per delivery destination 1054 of the delivery destination by2 and the value C2 (by3) (route service) of the cost per delivery destination 1054 of the delivery destination by3 in the delivery service dr2. The evaluation device 100 selects the cheaper delivery service of the total C1 of costs and the total C2 of cost.

Figure 22B:
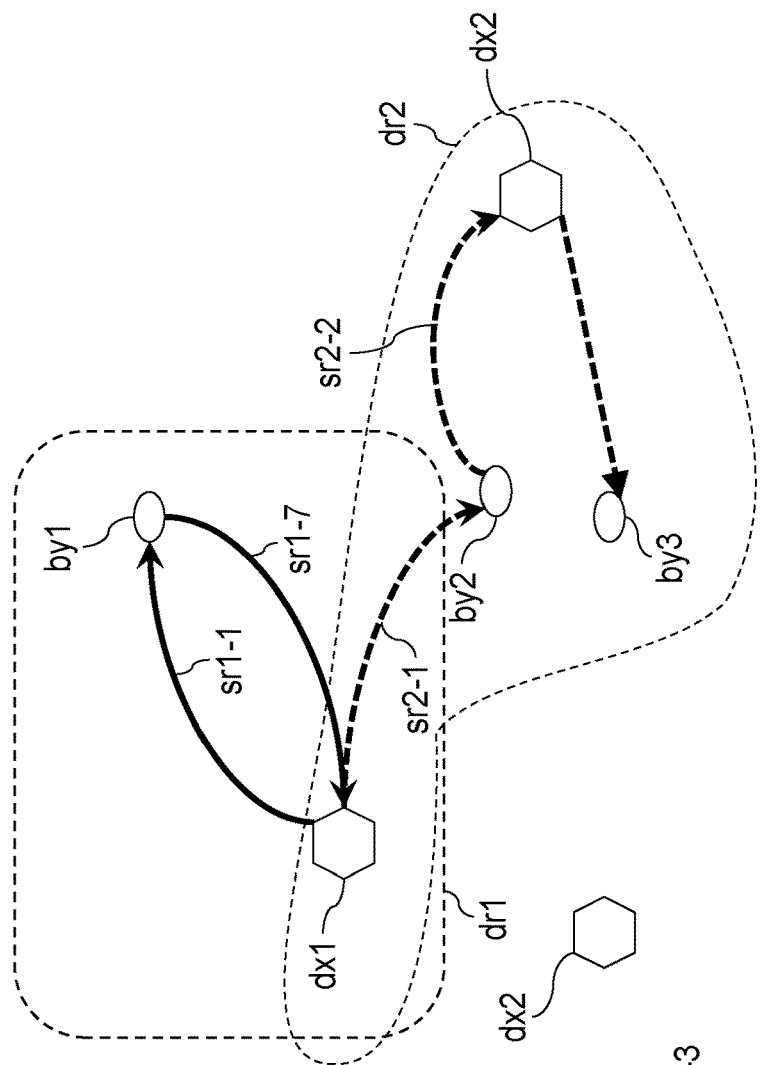
FIGS. 22A and 22B are second explanatory diagrams showing the conflict resolution example 2.
Figure 22A:
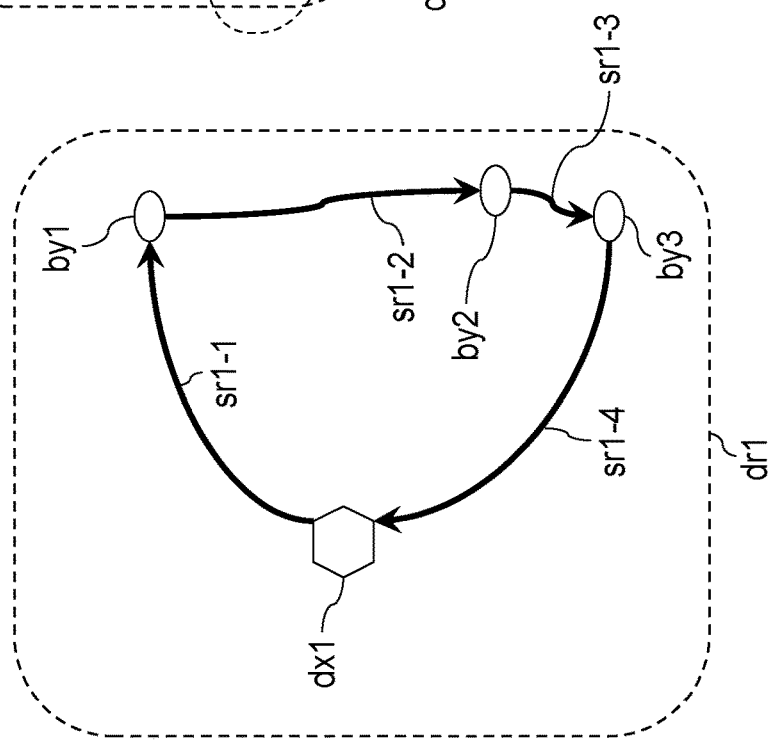

FIG. 22 is a second explanatory diagram showing the conflict resolution example 2. FIG. 22 shows the state after the conflict resolution. In FIG. 22, (A) is a selection example when the total C1 of costs is cheaper. Since the evaluation device 100 selects the delivery service dr1, the delivery service dr2 is deleted. That is, cargo is not delivered from the base dx2 to the delivery destinations by2 and by3. (B) is a selection example when the total C2 of costs is cheaper. Since the delivery service dr2 is selected, the evaluation device 100 recalculates the delivery service dr1 (route delivery) so that the delivery service dr1 does not pass via the delivery destinations by2 and by3. In the delivery service dr1, the evaluation device 100 connects the delivery destination by1 and the base dx1 by a section course sr1-7. As a result, the conflict of the delivery destinations by2 and by3 is resolved. In (B), the delivery service dr1 between the base dx1 and the delivery destination by1 is set as the route delivery, but may be the route service.

Example of Output Screen

Figure 23:
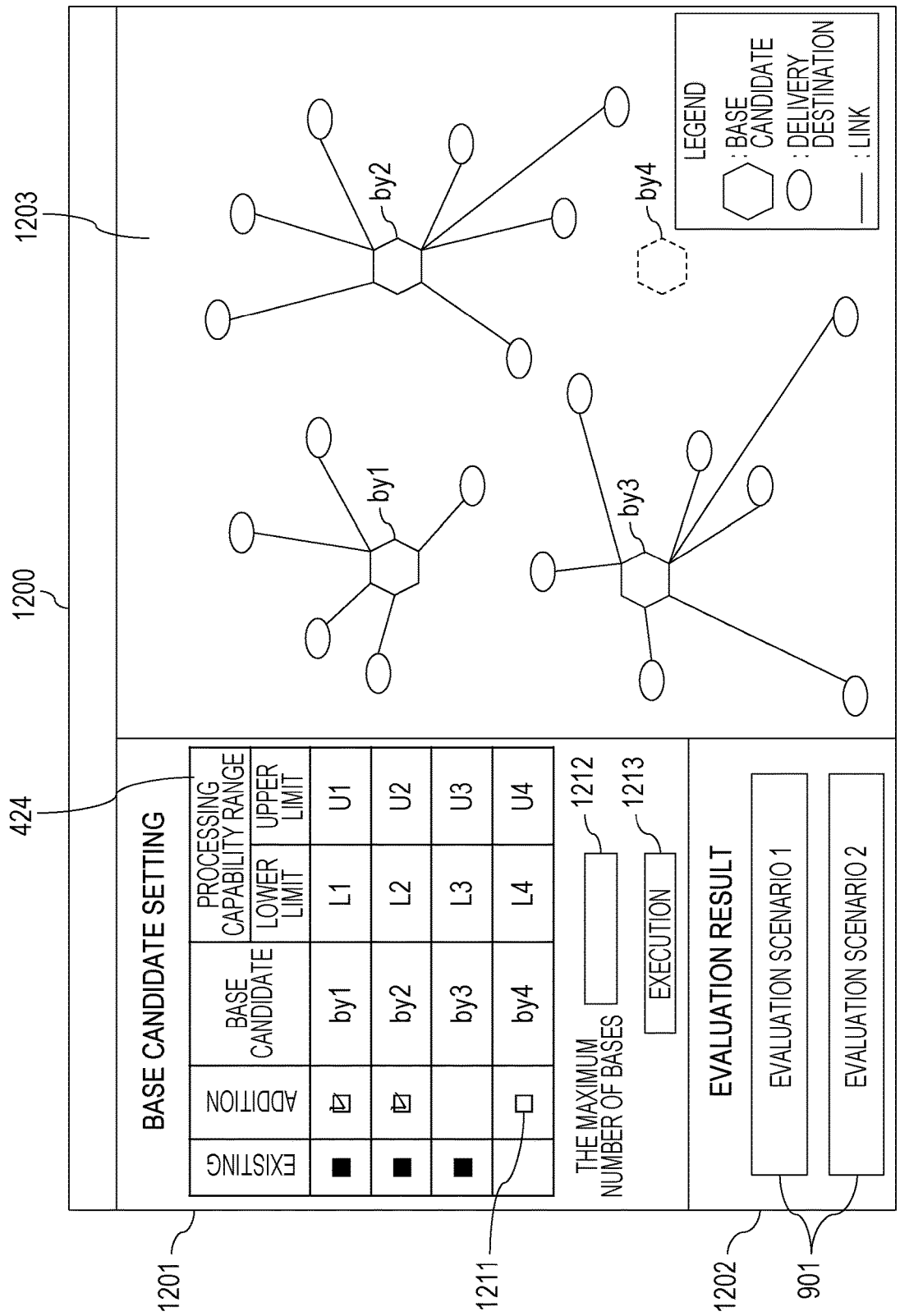
FIG. 23 is an explanatory diagram showing display screen example 2 of the evaluation device.

FIG. 23 is an explanatory diagram showing display screen example 2 of the evaluation device 100. The display screen 1200 displays, as the evaluation result 913, an icon indicating the base, an icon indicating the delivery destination, and an icon of a link indicating the allocation between the base and the delivery destination on the map information display region 1203.

In the display screen 1200, the link indicating the allocation between the base and the delivery destination may distinguish a drawing method such as line color or a broken line depending on whether the delivery means is the route service or the route delivery. In addition, a thickness of the link may be changed according to the quantity delivered from the base to the delivery destination. Specifically, for example, the larger the quantity, the thicker the link becomes. In addition, a boundary line with the delivery destination allocated to different bases may be drawn, and a region surrounded by the boundary line may be painted with a color associated with the allocated base. Instead of the link, the actual route services or the route of the route delivery may be displayed.

Processing Example when Area Information 410 is Used

Figure 24:
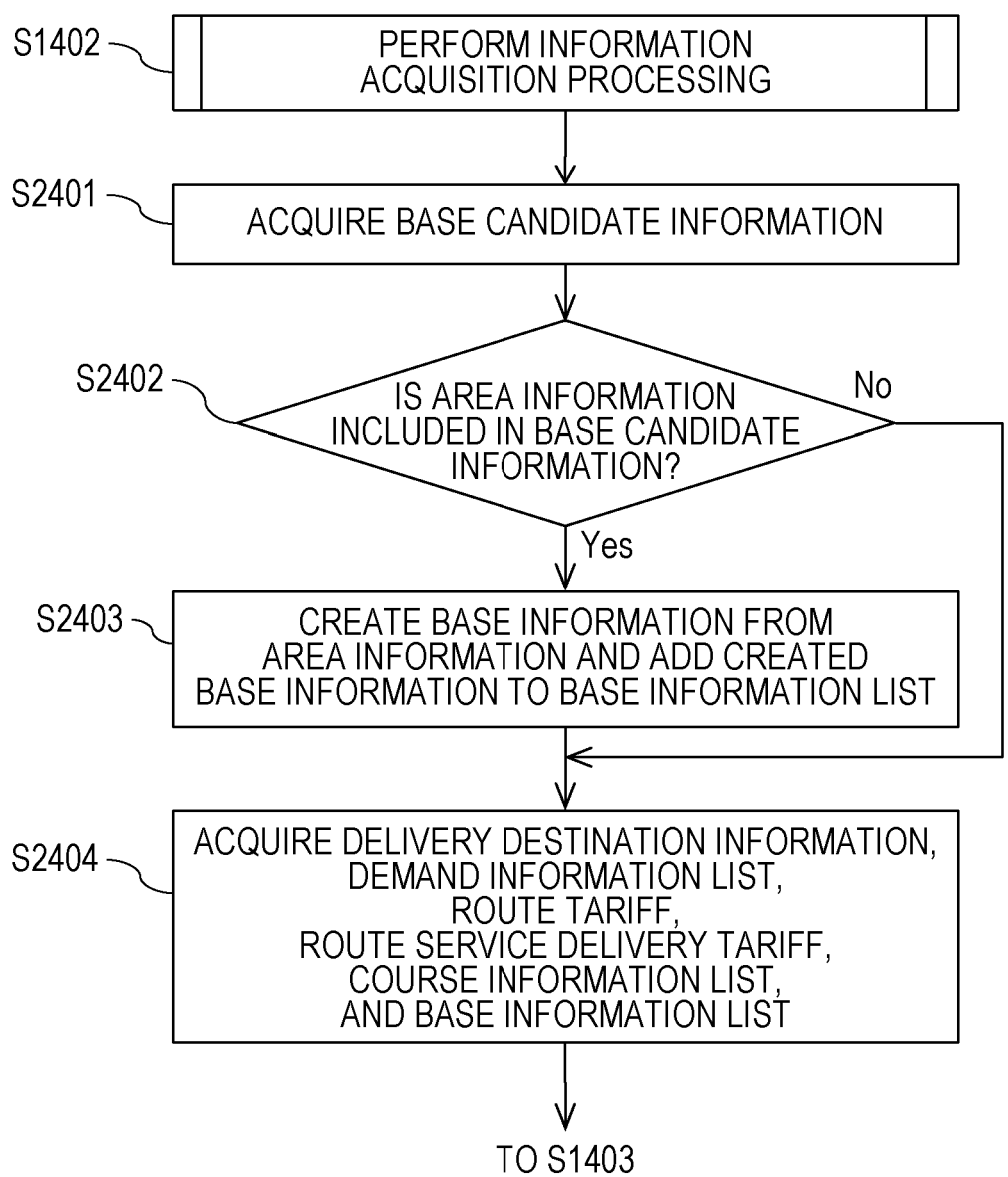
FIG. 24 is a flowchart showing a detailed processing procedure example of information acquisition processing (step S1402) shown in FIG. 14.

FIG. 24 is a flowchart showing a detailed processing procedure example of the information acquisition processing (step S1402) shown in FIG. 14. The evaluation device 100 acquires the base candidate information 123 (step S2401). The evaluation device 100 determines whether or not the acquired base candidate information 123 includes the area information 410 (step S2402). Since when the area information 410 is not included (step S2402: No), it means that the base information list 420 includes at least one base information 400, the processing proceeds to step S2402.

On the other hand, when the area information 410 is included (step S2402: Yes), the evaluation device 100 creates the base information 400 from the area information 410 and adds the created base information 400 to the base information list 420 (step S2403). Specifically, for example, the evaluation device 100 refers to the area designation information 411 included in the area information 410, divides an inside of areas, such as a country or a prefecture designated by the area designation information 411, with a detail level defined by the region division level 413 by using the region division method 412 designated by the region division method 412, and creates one base information 400 for each divided area.

As an example, when the targeted area is Japan, the region division method 412 is administrative division, and the region division level 413 is prefecture, the evaluation device 100 creates the base information 400 at a prefectural seat of the prefecture and adds the created base information 400 to the base information list 420. As another example, when the targeted area is Tokyo, the region division method 412 is grid division, and the region division level 413 is set to be 10 km, the evaluation device 100 divides an inside of Tokyo by a grid of 10 km units and creates the base information 400 at central stores of each grid. The processing proceeds to step S2404.

In step S2404, the evaluation device 100 acquires the delivery destination information 121, the demand information list 122, the route service tariff 124A1, the route delivery tariff 124B1, the course information list 125, and the base information list 420 (step S2404). The processing proceeds to step S1403. In this way, even when the user has not determine the detailed candidate point, by designating a rough area for considering the base disposition 831 as the area information 410, it is possible to comprehensively evaluate regions suitable for the base disposition 831 from among small regions obtained by dividing the inside of the area.

When step S2403 is executed, the evaluation device 100 may set the selected number of bases to be one, hold the evaluation result 913 when selecting all the base information 400 included in the base candidate information 123, and display the held evaluation result 913 on the display screen 1200.

Figure 25:
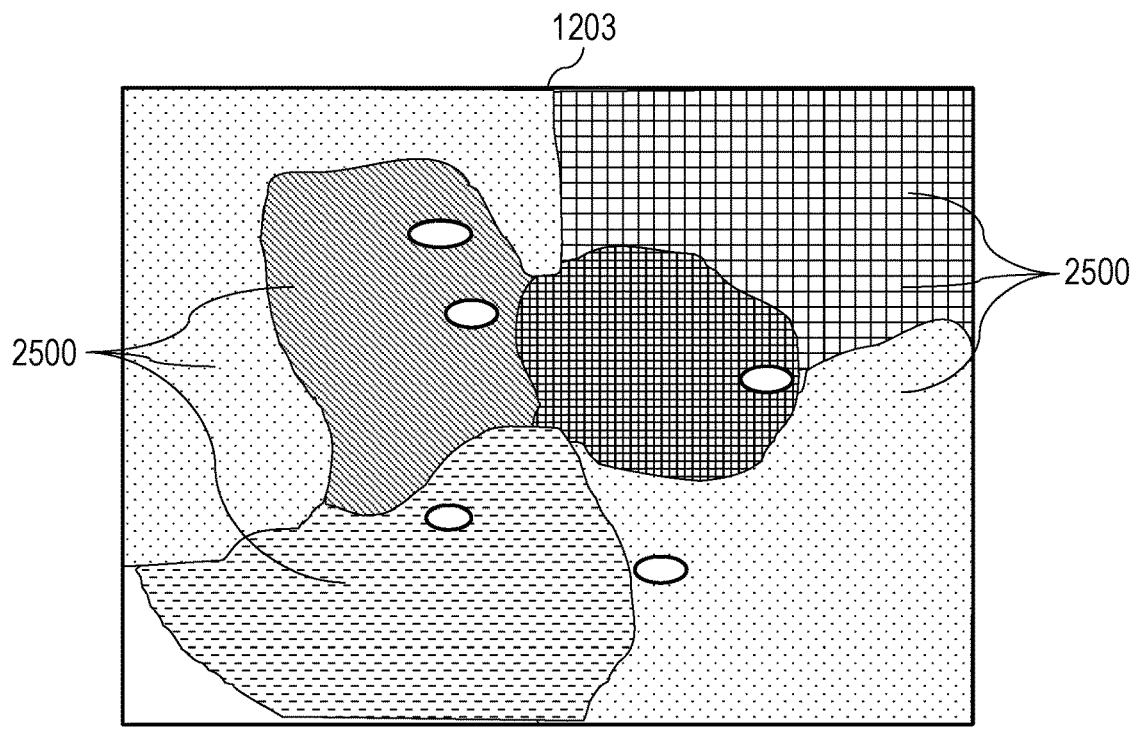
FIG. 25 is an explanatory diagram showing another example of a map information display region.

FIG. 25 is an explanatory diagram showing another example of the map information display region 1203. In FIG. 25, by painting and partitioning the region 2500 on the map image corresponding to each base information 400 by a color scheme based on the evaluation result 913 selecting each base information 400, the user can intuitively understand a distribution tendency of locations suitable for a disposition of one base on the map.

Other Display Examples

In the output processing (step S1407), the evaluation device 100 may create a time chart of each delivery service and display the created time chart on the display screen 1200.

Figure 26:
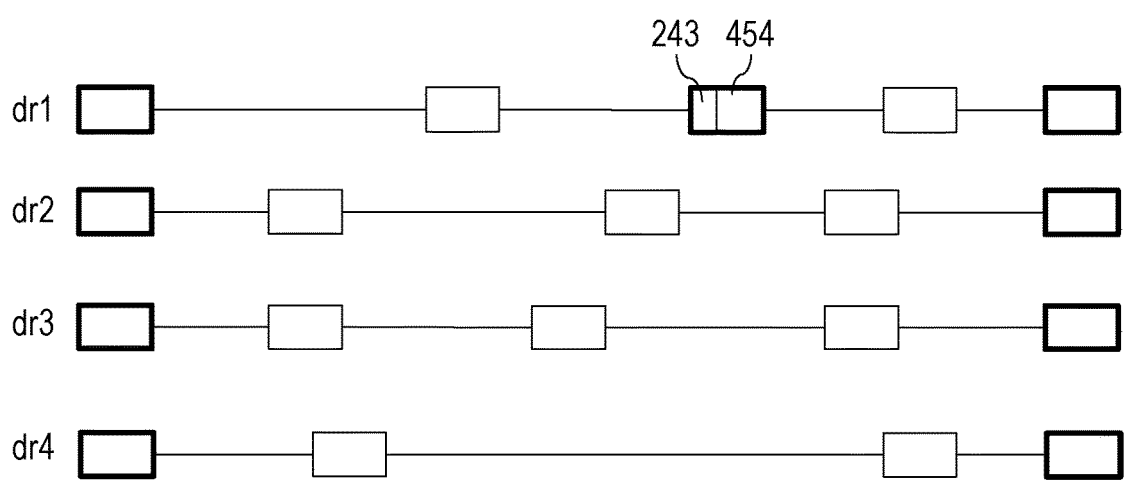
FIG. 26 is an explanatory diagram showing a time chart of a delivery service.

FIG. 26 is an explanatory diagram showing a time chart of the delivery service. FIG. 26 shows, for example, a time chart of the delivery services dr1 to dr4 at a certain base dx1 is shown. A horizontal axis is a time axis. In the case of passing via another base, the unloading time 243 of the empty box and the loading time 454 of empty cargo at the base are displayed. In this way, it is possible to intuitively understand at what time and which delivery service arrives via which delivery destination or other bases.

In addition, when the distribution warehouse property information 127 is used, after the step S1406, the evaluation device 100 may extract the distribution warehouse property information 127 that can be handled as the implementation of the selected base based on the positional information of the selected base, the processing capability range 424, and the shipping constraint condition 425 from among at least one distribution warehouse property information 127, for each selected base of the base disposition 831 determined in step S1406.

In this case, the evaluation device 100 refers to the storage cost unit price 1105 and the shipping cost unit price 1106 included in the extracted distribution warehouse property information 127 and uses the processing quantity 842 of the selected base included in the evaluation result 913 to calculate the storage cost and the shipping cost when the distribution warehouse is used. The evaluation device 100 adds the storage cost and the shipping cost to the cost 833 of the base disposition 831 determined in step S1406. As a result, it is possible to provide the user with the cost 833 in consideration of the storage cost and the shipping cost.

In addition, the evaluation device 100 may adopt a plurality of demand information lists 122. In this case, the evaluation device 100 weights each demand information list 122. The demand information list 122 shows, for example, a store opening schedule of a base and a delivery destination. Specifically, for example, it is assumed that there are two different demand information lists 122 for the bases dx1, dx2, and dx3. A weighting factor w1 of the first demand information list 122 is equal to 20%, and a weighting factor w2 of the second demand information list 122 is equal to 80%. The weight indicates, for example, a prediction rate of a store opening plan. The evaluation device 100 calculates the costs for each combination of the bases dx1, dx2, and dx3 for each of the demand information lists 122 through the above-described evaluation processing.

FIG. 27 is an explanatory diagram showing cost calculation examples for each combination of the bases for each demand information list 122. In FIG. 27, cost Cx_y is a cost of a combination y (y is the set of numbers at the end of the sign of the base) of the bases dx1, dx2, and dx3 in an x-th demand information list. The evaluation device 100 adopts a minimum total among the total T1 to T123 of each combination. For example, if the total T12 is a minimum value, the combination of the bases is the bases dx1 and dx2. Therefore, even when either of the first demand information list and the second demand information list is selected, the user can select the combination of the bases dx1 and dx2 that minimize costs.

As another use example, by using the demand information list 122 for each day of the week and making the weights equal, it is possible to derive the base disposition 831 which minimizes the cost 833 of the delivery schedule 832 for the demand on all days of the week.

In this way, the evaluation device 100 uses the base information 400, the delivery destination information 121, the demand information list 122 including one or more demand information, and the route service delivery tariff 124A1 to create the delivery course information 857 relating to the route service which includes a delivery course along which a delivery vehicle delivers a quantity of cargo delivered to a delivery destination from a base to the delivery destination by the route service and the cost per delivery course 1002. In addition, the evaluation device 100 uses the base information 400, the delivery destination information 121, the demand information list 122 including one or more demand information, and the route delivery tariff 124B1 to create the delivery course information 857 relating to the route delivery which includes a delivery course along which a delivery vehicle delivers a quantity of cargo delivered to a delivery destination from a base to the delivery destination by the route delivery and the cost per delivery course 1002.

The evaluation device 100 extracts the delivery course information 857 from each of the bases (selected base information 841) configuring the combination (base disposition 831) of bases for each combination (base disposition 831) of a plurality of bases from the set (delivery course information list 856) of the created delivery course information 857 based on the cost per delivery course 1002 included in the delivery course information 857, thereby determining the delivery schedule 832. The evaluation device 100 outputs the delivery schedule 832 of each combination (base disposition 831) of the determined plurality of bases.

In this way, it is possible to provide the delivery schedule 832 of each combination of the plurality of bases in consideration of both the route service and the route delivery, for each combination (base disposition 831) of the bases.

In addition, the evaluation device 100 selects a combination of specific bases from the combinations of the plurality of bases (base disposition 831) based on a total value (cost 833) of cost per delivery course 1002 included in each delivery schedule 832. The evaluation device 100 outputs the evaluation result 913 which includes the combinations of the selected specific bases, the specific delivery schedule 832 for the combinations of the specific bases (base disposition 831), and the cost per delivery course 1002 for the specific delivery schedule 832.

As a result, instead of individually evaluating the allocation of the base and the delivery destination, an optimum allocation including all bases and destinations is determined and selected as a whole. Therefore, it is possible to concurrently plan the position of the base, the delivery means by either the route service or the route delivery, and the base disposition and the disposition schedule optimizing the whole of the delivery course.

In addition, the evaluation device 100 selects the combination (base disposition 831) of the specific bases in which the total value (cost 833) of the cost per delivery course 1002 is minimal from the combinations of the plurality of bases.

As a result, it is possible to provide the base disposition 831 in which the cost 833 is minimal. Here, although the cost 833 is selected to be minimal, the base disposition 831 having the cost 833 which is a predetermined threshold or less may be selected, or may be selected in ascending order of the cost 833.

In addition, the evaluation device 100 stores the area information 410 that defines the area in the memory device 102. The area information 410 includes the area designation information 411 for specifying the area, the region division method 412 which defines the method for dividing an area into a plurality of regions, the region division level 413 for defining the division detail level by the region division method 412. The evaluation device 100 divides the specific region into the plurality of specific areas using the area information 410 and holds the specific positional information within the specific region as the positional information 423 of the base, thereby creating the base information 400 and storing the created base information in the memory device 102.

In this way, even when the user does not determine the detailed candidate point, by designating a rough area for considering the base disposition 831 as the area information 410, it is possible to comprehensively evaluate regions suitable for the base disposition 831 from among small regions obtained by dividing the inside of the area.

In addition, the evaluation device 100 displays the map information including the specific base, the specific delivery destination, and the information (link) associated with the specific base and the specific delivery destination. As a result, it is possible to visually recognize the allocation between the specific base and the specific destination.

In addition, the evaluation device 100 stores at least one of the constraint conditions (delivery constraint condition 425) relating to the shipment of cargo from a base and the constraint condition (delivery constraint condition 204) relating to the delivery of cargo at the delivery destination in the memory device 102. The evaluation device 100 executes the creation processing (step S1403) and the determination processing (step S1405) so as to observe at least one of the constraint conditions. As a result, it is possible to find out an optimal solution under more realistic conditions.

In addition, the evaluation device 100 controls the display screen to display a time chart indicating the delivery order of the specific base and the specific delivery destination in time series. In this way, it is possible to intuitively understand at what time and in what order cargo is delivered to which delivery destination.

In addition, the evaluation device 100 may create the delivery course information on the delivery service in which the route service and the route delivery are mixed. As a result, it is possible to obtain the delivery schedule in consideration of various delivery course information. For example, although the delivery is the route delivery delivered from the base dx1 to the delivery destinations by1 and by2 at the beginning of the departure, the evaluation device 100 may create the delivery course information performing delivery via another base dx2 on the way to the delivery destination by3 by the route service. On the contrary, although the delivery is the route service delivered from the base dx1 to the delivery destination by1 at the beginning of the departure, the evaluation device 100 may create the delivery course information performing delivery via another base dx2 on the way to the delivery destinations by2 and by3 by the route delivery. As a result, it is possible to create effective delivery route information when the cost is lowered if the type of delivery services is switched on the way.

In addition, the evaluation device 100 stores the distribution warehouse property information 127 holding the positional information 1102 of the distribution warehouse, the storage cost unit price 1105 of the cargo, and the shipping cost unit price 1106 of the cargo in the memory device 102. When there is the distribution warehouse matching the positional information 423 of the specific base, the evaluation device 100 calculates the storage cost and the shipping cost at the specific base based on the quantity of the cargo in the delivery schedule 832 and adds the calculated costs to the total value (cost 833) of the cost per delivery course 1002. As a result, it is possible to provide the user with the cost 833 in consideration of the storage cost and the shipping cost.

In addition, the evaluation device 100 uses the first demand information to multiply the first weighting factor w1 by each of the first total values (cost 833) of the cost per delivery course 1002 included in each of the delivery schedule 832 of the combinations (base disposition 831) of the plurality of bases obtained by executing the creation processing (step S1403) and the determination processing (step S1405). The evaluation device 100 uses the second demand information to multiply the second weighting factor w2 by each of the second total values (cost 833) of the cost per delivery course 1002 included in each of the delivery schedule 832 of the combinations (base disposition 831) of the plurality of bases obtained by executing the creation processing (step S1403) and the determination processing (step S1405). The evaluation device 100 adds the value obtained by multiplying the first weighting factor by the first total value and the value obtained by multiplying the second weighting factor by the second total value, for each combination of the plurality of bases.

As a result, it is possible to compare addition results for each combination of bases, and it is possible to understand the combination of bases that are advantageous even if any demand information is adopted.

The present invention is not limited to the above-described embodiments, but includes various modified examples. For example, the above-described embodiments have been described in detail in order to explain the present invention in an easy-to-understand manner, and are not necessarily limited to those having all the configurations described. In addition, it is possible to replace a part of the configuration of one embodiment with the configuration of another embodiment, and add the configuration of another embodiment to the configuration of one embodiment. Further, it is possible to add, delete, and replace other configurations with respect to part of the configuration of each embodiment.

In addition, the above-described configurations, functions, a controller 5, processing means, and the like may be realized with hardware by designing a part or all thereof in, for example, an integration circuit and the like. In addition, each of the above-described configurations, functions, and the like may be realized with software by a processor interpreting and executing a program that realizes each function thereof. Information such as a program, a table, a file, and the like realizing each function can be stored in a memory, storage devices such as HDD, and SDD, or storage media such as an IC card, an SD card, and a DVD.

The invention claimed is:

1. An evaluation device, comprising:
a processor for executing a program; and
a memory device for storing the program, wherein
the memory device is configured to store:
base information which holds positional information of distribution bases,
delivery destination information which holds positional information of delivery destinations,
demand information which holds a size and a quantity of cargo delivered from a distribution base to a delivery destination,
a route service tariff which holds cost determined by a size of the cargo and a delivery distance of the cargo from the distribution base to the delivery destination in a route service in which the cargo of a plurality of shippers is mixed on one delivery vehicle,
a route delivery tariff which holds cost determined by loading capacity of the delivery vehicle and a delivery distance of the cargo from the distribution base to the delivery destination in a route delivery in which one delivery vehicle loaded with a cargo of one shipper circulates the delivery destinations from the distribution base so as to deliver the cargo,
the processor is configured to:
create delivery course information on a route service including a delivery course along which the delivery vehicle delivers a quantity of the cargo delivered to the delivery destination from the distribution base to the delivery destination in the route service and delivery cost of the delivery course, based on the base information, the delivery destination information, the demand information, and the route service tariff,
create delivery course information on a route delivery including a delivery course along which the delivery vehicle delivers the quantity of the cargo delivered to the delivery destination from the distribution base to the delivery destination in the route delivery and delivery cost of the delivery course, based on the base information, the delivery destination information, the demand information, and the route delivery tariff, determine a delivery schedule by extracting the delivery course information from each of the distribution bases configuring a combination of the distribution bases for each combination of a plurality of distribution bases from a set of the created delivery course information based on the delivery cost included in the delivery course information, output the determined delivery schedule of each combination of the plurality of distribution bases, draw a graphical user interface comprising a processing capability range for each of the plurality of distribution bases and a map information display region, receive user input from a user input device to update the processing capability range defining an upper and lower limit of the cargo to be delivered for each of the plurality of distribution bases, and generate an evaluation scenario in the map information display region based on the updated processing capability range, wherein the generation of the evaluation comprises:

disposing a specific base as a base icon on the map information display region using the positional information of the distribution bases, disposing a specific delivery destination as a delivery destination icon on the map information display region using the positional information of the delivery destinations, drawing a link icon between the base icon and the delivery destination icon using a line drawn in a varying manner depending on whether the cargo is delivered by the route service or the route delivery, partitioning the map information display region into bounded colored regions surrounding each of a plurality of base icons to indicate the delivery destinations allocated to each distribution base according to a color scheme, and changing a thickness of the drawn link icon according to the quantity of the cargo delivered from the specific base to the specific delivery destination such that the link icon updates to become thicker as the quantity of the cargo delivered becomes larger.

2. The evaluation device according to claim 1, wherein the processor is further configured to:

select a combination of specific bases from a combination of the plurality of distribution bases based on a total value of the delivery costs included in each determined delivery schedule, and output an evaluation result which includes a combination of the selected specific bases, a specific delivery schedule for the combination of the specific bases, and a total value of the delivery costs for the specific delivery schedule.

3. The evaluation device according to claim 2, wherein the processor is further configured to:

select the combination of the specific bases in which the total value of the delivery costs are minimal from the combination of the plurality of distribution bases.

4. The evaluation device according to claim 1, wherein the memory device has area information which defines an area, and the area information comprises area designation information which designates the area, a region division method which defines a method for dividing the area into a plurality of regions, and a region division level which defines a division detail level by the region division method, and the processor is further configured to:

divide a specific area into a plurality of specific regions using the area information and holds specific positional information within the specific regions as positional information of the base to create the base information and store the created base information in the memory device.

5. The evaluation device according to claim 2, wherein the memory device is further configured to store at least one of a constrain condition relating to shipping of the cargo from the base and a constraint condition relating to delivery of the cargo at the delivery destination, and the processor is further configured to observe the constraint condition.

6. The evaluation device according to claim 5, wherein the constraint condition includes a constraint condition relating to a time, and the processor is further configured to:

control a display screen to display a time chart indicating a delivery order of the specific base and the specific delivery destination in time series.

7. The evaluation device according to claim 1, wherein the processor is further configured to:

create the delivery course information in which the route service and the route delivery are mixed.

8. The evaluation device according to claim 1, wherein the memory device is further configured to store distribution warehouse property information which holds positional information of a distribution warehouse, a storage cost unit price of the cargo, and a shipping cost unit price of the cargo, the processor is further configured to:

calculate a storage cost and a shipping cost at the base included in the delivery schedule based on the quantity of the cargo in the delivery schedule when there is a distribution warehouse matching positional information of the base included in the distribution schedule and adding the calculated costs to a total value of the delivery costs, and output the calculation results.

9. The evaluation device according to claim 1, wherein the processor is further configured to:

multiply a first weighting factor by each of a first total value of the delivery costs included in a delivery schedule of each combination of the plurality of distribution bases obtained using first demand information, multiply a second weighting factor by each of a second total value of the delivery costs included in a delivery schedule of each combination of the plurality of distribution bases obtained using second demand information, and add a value obtained by multiplying the first weighting factor by the first total value and a value obtained by multiplying the second weighting factor by the second total value for each combination of the plurality of distribution bases, and, the processor is further configured to output calculation result.

10. An evaluation method by an evaluation device including a processor for executing a program and a memory device for storing the program, the evaluation method comprising:

storing base information which holds positional information of distribution bases, storing delivery destination information which holds positional information of delivery destinations, storing demand information which holds a size and a quantity of cargo delivered from a distribution base to a delivery destination, storing a route service tariff which holds cost determined by a size of the cargo and a delivery distance of the cargo from the distribution base to the delivery destination in a route service in which the cargo of a plurality of shippers is mixed on one delivery vehicle, storing a route delivery tariff which holds cost determined by loading capacity of the delivery vehicle and a delivery distance of the cargo from the distribution base to the delivery destination in a route delivery in which one delivery vehicle loaded with a cargo of one shipper circulates the delivery destinations from the distribution base so as to deliver the cargo, creating delivery course information on a route service including a delivery course along which the delivery vehicle delivers a quantity of the cargo delivered to the delivery destination from the distribution base to the delivery destination in the route service and delivery cost of the delivery course, based on the base information, the delivery destination information, the demand information, and the route service tariff, creating delivery course information on a route delivery including a delivery course along which the delivery vehicle delivers the quantity of the cargo delivered to the delivery destination from the distribution base to the delivery destination in the route delivery and delivery cost of the delivery course, based on the base information, the delivery destination information, the demand information, and the route delivery tariff, determining a delivery schedule by extracting the delivery course information from each of the distribution bases configuring a combination of the distribution bases for each combination of a plurality of distribution bases from a set of the created delivery course information based on the delivery cost included in the delivery course information, outputting the determined delivery schedule of each combination of the plurality of distribution bases, drawing a graphical user interface comprising a processing capability range for each of the plurality of distribution bases and a map information display region, receiving user input from a user input device to update the processing capability range defining an upper and lower limit of the cargo to be delivered for each of the plurality of distribution bases, and generating an evaluation scenario in the ma information display region based on the updated processing capability range, wherein the generation of the evaluation comprises:

disposing a specific base as a base icon on the map information display region using the positional information of the distribution bases, disposing a specific delivery destination as a delivery destination icon on the map information display region using the positional information of the delivery destinations, drawing a link icon between the base icon and the delivery destination icon using a line drawn in a varying manner depending on whether the cargo is delivered by the route service or the route delivery;

partitioning the map information display region into bounded colored regions surrounding each of a plurality of base icons to indicate the delivery destinations allocated to each distribution base according to a color scheme, and changing a thickness of the drawn link icon according to the quantity of the cargo delivered from the specific base to the specific delivery destination such that the link icon updates to become thicker as the quantity of the cargo delivered becomes larger.

11. A non-transitory computer-readable medium comprising instructions operable, when executed by one or more computing systems, to:

store base information which holds positional information of a distribution bases, store delivery destination information which holds positional information of delivery destinations, store demand information which holds a size and a quantity of cargo delivered from a distribution base to a delivery destination, store a route service tariff which holds cost determined by a size of the cargo and a delivery distance of the cargo from the distribution base to the delivery destination in a route service in which the cargo of a plurality of shippers is mixed on one delivery vehicle, store a route delivery tariff which holds cost determined by loading capacity of the delivery vehicle and a delivery distance of the cargo from the distribution base to the delivery destination in a route delivery in which one delivery vehicle loaded with a cargo of one shipper circulates the delivery destinations from the distribution base so as to deliver the cargo, create delivery course information on a route service including a delivery course along which the delivery vehicle delivers a quantity of the cargo delivered to the delivery destination from the distribution base to the delivery destination in the route service and delivery cost of the delivery course, based on the base information, the delivery destination information, the demand information, and the route service tariff, create delivery course information on a route delivery including a delivery course along which the delivery vehicle delivers the quantity of the cargo delivered to the delivery destination from the distribution base to the delivery destination in the route delivery and delivery cost of the delivery course, based on the base information, the delivery destination information, the demand information, and the route delivery tariff, determine a delivery schedule by extracting the delivery course information from each of the distribution bases configuring a combination of the distribution bases for each combination of a plurality of distribution bases from a set of the created delivery course information based on the delivery cost included in the delivery course information, output the determined delivery schedule of each combination of the plurality of distribution bases, draw a graphical user interface comprising a processing capability range for each of the plurality of distribution bases and a map information display region, receive user input from a user input device to update the processing capability range defining an upper and lower limit of the cargo to be delivered for each of the plurality of distribution bases, and generate an evaluation scenario in the ma information display region based on the updated processing capability range, wherein the generation of the evaluation comprises:
- disposing a specific base as a base icon on the map information display region using the positional information of the distribution bases,
- disposing a specific delivery destination as a delivery destination icon on the map information display region using the positional information of the delivery destinations,
- drawing a link icon between the base icon and the delivery destination icon using a line drawn in a varying manner depending on whether the cargo is delivered by the route service or the route delivery,
- partitioning the map information display region into bounded colored regions surrounding each of a plurality of base icons to indicate the delivery destinations allocated to each distribution base according to a color scheme, and
- changing a thickness of the drawn link icon according to the quantity of the cargo delivered from the specific base to the specific delivery destination such that the link icon updates to become thicker as the quantity of the cargo delivered becomes larger.

12. The evaluation device according to claim 1, wherein the processor is further configured to perform conflict resolution processing, comprising:
- determining that the delivery course of the route service and the delivery course of the route delivery share one or more common destinations;
- comparing a total route service tariff with a total route delivery tariff for delivery to each of the one or more common destinations;
- selecting either the delivery course of the route service or the delivery course of the route delivery based on the comparing; and
- recalculating the unselected delivery course to delete the one or more common destinations.

* * * * *